United States Patent [19]
Levinson

[11] Patent Number: 5,404,505
[45] Date of Patent: Apr. 4, 1995

[54] SYSTEM FOR SCHEDULING TRANSMISSION OF INDEXED AND REQUESTED DATABASE TIERS ON DEMAND AT VARYING REPETITION RATES

[75] Inventor: Frank H. Levinson, Palo Alto, Calif.
[73] Assignee: Finisar Corporation, Menlo Park, Calif.
[21] Appl. No.: 786,453
[22] Filed: Nov. 1, 1991
[51] Int. Cl.⁶ .................................. G06F 15/40
[52] U.S. Cl. .................................. 395/600; 370/92; 348/3; 364/DIG. 1; 364/282.1; 364/282.3; 364/282.4; 364/283.1; 364/283.2; 364/283.3; 364/284.1; 364/284.3
[58] Field of Search ............... 395/600; 370/92; 348/3

[56] References Cited

U.S. PATENT DOCUMENTS

| | | | |
|---|---|---|---|
| 4,429,385 | 1/1984 | Cichelli et al. | 370/92 |
| 4,706,121 | 11/1987 | Young | 358/142 |
| 4,956,772 | 9/1990 | Neches | 395/650 |
| 4,994,926 | 2/1991 | Gordon et al. | 358/400 |
| 5,164,938 | 11/1992 | Jurkevich et al. | 370/60 |
| 5,193,189 | 3/1993 | Flood et al. | 395/650 |
| 5,220,420 | 6/1993 | Hoarty et al. | 358/86 |
| 5,220,501 | 6/1993 | Lawlor et al. | 364/408 |
| 5,321,750 | 6/1994 | Nadan | 380/20 |

*Primary Examiner*—Thomas G. Black
*Assistant Examiner*—Wayne Amsbury
*Attorney, Agent, or Firm*—Flehr, Hohbach, Test, Albritton & Herbert

[57] ABSTRACT

An information broadcasting system provides a large number of subscribers access to a large amount of information using one or more satellite transmission channels. The system can also use cable television transmission channels. A program supplier station stores an information database and tags all the information in the database with indices so as to form a single hierarchical structure which encompasses the entire information database. Portions of the information database are transmitted often, at least once per day, in order to provide the basic subscriber with information need to access the remainder of the database. The information provided by the basic subscriber service, which will typically include at least 50 gigabytes of data, is available to all subscribers without requiring two way communications between the subscribers and the program supplier station. Using a tiered system for scheduling transmission of the 50 gigabytes or so of information included in the basic subscriber service, as well as an intelligent subscriber request anticipation scheme for retrieving information before the subscriber asks for it, the present invention provides subscribers with reasonably quick access to all the contents of the large database while using only a modest amount of bandwidth. Furthermore, by reserving a portion of the system's bandwidth for satisfying requests for access to information not provided with the basic subscriber service, timely access to a virtually unlimited amount of information can be provided, using the same modest transmission bandwidth, to those subscribers willing to pay additional fees for that service.

48 Claims, 6 Drawing Sheets

SYSTEM FOR SCHEDULING TRANSMISSION OF INDEXED AND REQUESTED DATABASE TIERS ON DEMAND AT VARYING REPETITION RATES

The present invention relates generally to the transmission or broadcasting of digital information to a wide base of subscribers, and particularly to methods and systems for providing access by many subscribers to an almost unlimited amount of information and/or programming material.

BACKGROUND OF THE INVENTION

The goal of computerized information servers is to provide a system that encourages use by subscribers, provides access to a large range of information, and which is flexible and inexpensive for information publishers. Computerized information services which exist today include Prodigy, Compuserve, and Dialog. Typically, the user either pays a monthly fee or a connect time fee for the most basic service and additional or special services are provided for additional fees.

All of the above mentioned computer services require two way communications between the user and the information server in order to service each new request by the user. In other words, the user sends requests, and then selected data is transmitted individually to that user in response to his/her request. This two way "query based" communication scheme is also prevalent in other types of information servers. For instance, the "pay per view" services provided by cable television companies allow a subscriber to call the company and request a movie.

The company then sends a signal to the subscriber's television signal decoder to enable it to decode the program on a particular channel during the period of time associated with the requested movie. In this case, the "information" (a program or movie) is being transmitted in any case, but subscribers are only provided access to the program if they pay a special fee.

Two major distinctions between the present invention and the prior art query based information servers are (1) the present invention has a bandwidth that is thousands of times of greater than the prior art systems, thereby enabling high speed, low cost distribution of information, and (2) the present invention greatly reduces the amount of two-way communication required between subscribers and the information server by automatically transmitting information that responds to most anticipated "requests" by subscribers. Only those subscriber requests not satisfied by the automatically transmitted information need to be conveyed to the information server.

The goal of the present invention is to provide widespread, high speed access to a virtual omniscient database having typically well in excess of a terabyte ($10^{12}$ bytes) of data. Using a data channel capable of transmitting, say, 1.5 megabytes of data per second, the present invention can provide virtually instantaneous access to about a 100 megabytes of information, high speed access (e.g., within two hours) to about a gigabyte of information, and can provide medium speed access, with perhaps 12 or 24 hour turn-around, to perhaps 100 terabytes of information. Furthermore, such access can be provided to a very large set of users without having to use a large number of data channels.

The large bandwidth of the present invention's information server enables the system to provide subscribers with multimedia programming, including video and audio programming. This is unlike current query based information servers, whose low bandwidth makes the distribution of video and audio programming impractical. The ability of the present invention to distribute information in multimedia form makes it much more attractive to both subscribers and potential information publishers, including advertisers.

It is important to note that while a user has access to perhaps a terabtye, or even 100 terabytes or more, of data, the total amount of data that systems in accordance with the present invention system can transmit in any one day is much more limited, as will be described below. This is not unlike visiting the main library of a major university, such as Yale or Harvard University, having stacks containing several million volumes of books. Having "access" to all those books every single day does not means that a user can receive them all in one day, nor does it mean that all the users can receive all the books in a single day. Nevertheless, each particular book (file or program) is available on relatively short notice, and having access to such a large collection of books (data) is still very useful.

The present invention also has tremendous cost advantages compared with information distribution using compact disks (CDs), and is believed to have distribution costs on the order of one thousand times less than any competing distribution media. The present invention eliminates both the need to generate "master" disks and the need to manufacture any physical media. Since distribution is accomplished by broadcasting, the actual costs for "publishing" a million copies of an average length novel (i.e., distributing it to a million subscribers) would be on the order of just a few dollars, versus a cost on the order a dollar or more per copy for printing either CDs or traditional books, plus similar costs for the physical distribution, resulting in traditional distribution costs totalling millions of dollars. Furthermore, updates to previously distributed information are also distributed at equally low cost using the present invention, in contrast with CD based publishing which requires mailing or otherwise physically producing and distributing new CDs to all previous purchasers.

SUMMARY OF THE INVENTION

In summary, the present invention is an information broadcasting system which provides a large number of subscribers access to a large amount of information using one or more satellite transmission channels. The broadcasting system can also use cable television transmission channels or any similarly structured data distribution network. The system has a program supplier station which stores an information database and tags all the information in the database with indices so as to form a single hierarchical structure which encompasses the entire information database. Portions of the information database are transmitted often, at least once per day, in order to provide the basic subscriber with information needed to access the remainder of the database. The information provided by the basic subscriber service, which will typically include at least 50 gigabytes of data, is available to all subscribers without requiring two way communications between the subscribers and the program supplier station.

By using a "tiered" system for scheduling transmission of the 50 gigabytes or so of information included in the basic subscriber service, as well as an "intelligent" subscriber request anticipation scheme for retrieving information before the subscriber asks for it, the present invention provides a huge number of subscribers with reasonably quick access to all the contents of the large database, This is accomplished even though only a modest amount of bandwidth is used. Furthermore, by reserving a portion of the system's bandwidth for satisfying requests for access to information not provided with the basic subscriber service, timely access to a virtually unlimited amount of information can be provided, using the same modest transmission bandwidth, to thousands of those subscribers willing to pay additional fees for that service.

The utility of the present can be further enhanced by using data compression techniques so as to increase the bandwidth of the information server, and by downloading software, data compression code books and the like along with the transmitted information. The present invention also includes the ability to automatically update the software used by subscribers' computers by transmitting the software updates along with other data transmitted by the information server, with different versions of the updated subscriber software being transmitted for each of the different platforms (i.e., types of CPUs) being used in subscribers' computers.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
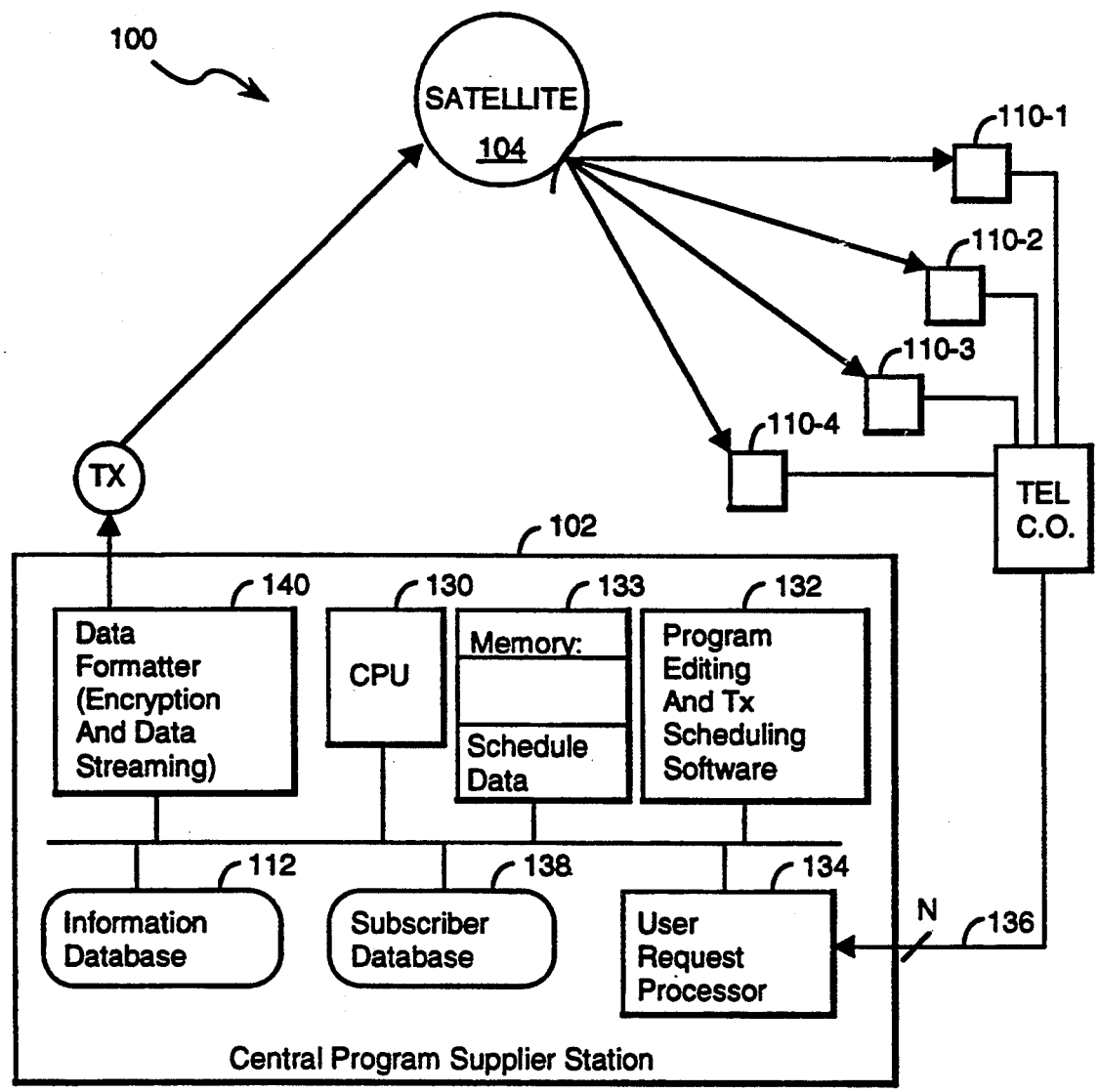
FIG. 1 is a block diagram of a "hyperbroadcast" data transmission system in accordance with the present invention, showing a receiving station suitable for use by a group of users.

Referring to FIG. 1, there is shown an information broadcasting or transmission system 100 having a single program supplier station 102 which transmits a stream of data via a satellite 104 to a large set of receiving stations 110 owned or leased by subscribers 110. Subscribers are persons, organizations and companies with equipment to receive transmissions on one or more dedicated channels broadcast by the satellite 104.

In one implementation of the invention, it is expected that subscribers will have access to the basic service without charge. This basic service provides unlimited access to a base set of information, which in the preferred embodiment is about fifty gigabytes of public service information, including information such as newspapers, weather reports and the like that are updated frequently. Subscribers also have free access to all information on the service which advertisers or other suppliers of paid programming, such as governments and schools, have provided for distribution to the general user community. This access may include the ability to receive the broadcasted advertising information as well as to make special telephone requests for additional information. Multiple channel versions of the system, which will include additional programming on separate transmission channels, will provide unlimited access to an even larger base set of information. In the preferred embodiment, all broadcast channels will include a mix of text, graphics, multimedia, audio, video and software programming, although the mix of programming materials will typically differ from channel to channel.

Subscribers who request transmission of data not included in the basic service could be charged for accessing that information. Information of this type is such that the provider of the information (e.g., a person or company owning copyrights on the information) has placed restrictions on how the information may be distributed. For example, the provider may require a transaction fee or royalty be paid before providing the subscriber with access codes to find or decrypt the information. Alternately, access to a set of information may be limited by a provider's requirement that he know who is receiving it. In either case, the subscriber, or his computer system, requests such information by calling the user request processor at a particular telephone number (toll free or otherwise) and specifying the information that the subscriber wishes to receive. The user is then given access codes and possibly decryption keys to enable the user to access the requested information.

Alternately, subscribers could be charged a monthly fee for the basic subscriber service. Access by nonsubscribers, in systems which charge for the basic subscriber service, would be blocked either by encrypting the transmitted data, or by giving only subscribers the packet ID required to access the root information required to access the rest of the database, as will be described in more detail below.

The database 112 of information provided by the program supplier station 102 is indexed in a hierarchical fashion, providing keyed or indexed access to all data within the database 112. The database 112 will typically have at least a hundred times more data that is available for retrieval than the data which is provided with the basic service. Subscriber requests for additional information are transmitted by conventional modems and telephone lines to the program supplier station 102, after which transmission of the requested information is scheduled for delivery (i.e., transmission) in the portion of the satellite's considerable bandwidth that is not used for transmitting the regularly scheduled basic programming. In the one-channel preferred embodiment, the system can transmit 32.4 gigabytes of specially requested data per day, which is expected to be sufficient to serve a subscriber base of approximately one million home users or several tens of thousands of commercial users. See Table 1 below. Additional transmission channels can be added as the subscriber base increases in size, and/or different satellite transmission channels can be used for different geographical areas.

As will next be described, the present invention uses a "tiered" system for scheduling transmission of the 50 gigabytes or so of information included in the basic subscriber service, as well as an "intelligent" subscriber request anticipation scheme for retrieving information before the subscriber asks for it. Together, these features of the present invention provide the system's subscribers with virtually instantaneous access to an large information database while using only a very modest amount of transmission bandwidth. Furthermore, by reserving a portion of the system's bandwidth for satisfying requests for access to information not provided with the basic subscriber service, timely access to a virtually unlimited amount of information can be provided to those subscribers, or advertisers, willing to pay additional fees for that service.

Overview of Basic Operation

Figure 2:
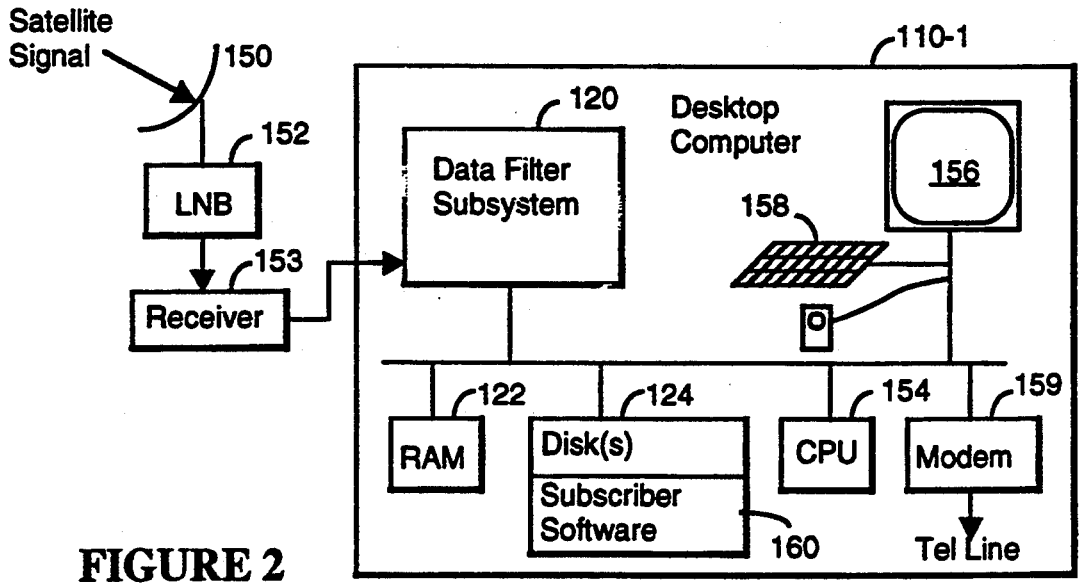
FIG. 2 is a block diagram of a typical receiving station for use by an individual.

Referring to FIGS. 1 and 2, the data stream is transmitted over a single satellite channel at a rate of 1.5 megabytes per second in fixed size 10KB (10 kilobyte) data packets having a maximum size of 10,000 bytes. The subscriber receiving stations 110 all include a data filter subsystem 120 (see FIG. 2) which receives the incoming data stream and selects those data packets that meet selection criteria defined by the receiving station 110, The information in the selected data packets is then downloaded into the memory 122–124 of the subscriber's workstation or other computer using software provided by the information network supplier for that purpose.

Typically, all subscriber stations are programmed to store a set of "root information", comprising about 250KB of information, which provides an index to the network's information database 112, Data packets containing this root information are marked to indicate the last time the root information was updated, and the subscriber stations are programmed to automatically replace their internal copy of the root information as updated information is received.

In addition, each subscriber can specify additional information from the database 112 that the subscriber wants to receive. All information in the system is hierarchically arranged, with the root information comprising the top several layers of the hierarchy. As will be described below, subscriber "requests" are made by selecting items from the top level menus, or by selecting "markers" in previously retrieved data that reference other portions of the network database. Each such marker includes a packet ID that is used by the receiver to select packets to be downloaded to the subscriber's computer, as well as a timestamp value indicating (A) whether or not the requested information is included in the basic subscriber service, and, if so, (B) the approximate time that the requested data is scheduled for transmission, Timestamps are described in more detail below. If the requested information is already scheduled for transmission sometime in the near future (either because it is part of the basic service, or because another subscriber recently requested the same item), the subscriber is informed of the expected arrival time.

If the requested data is not included in the basic subscriber service, and if the subscriber is authorized to request additional information (i.e., has signed an agreement to pay for the transmission of addition data), the request for additional information is transmitted by conventional modems and telephone lines to the program supplier station 102, after which transmission of the requested information is scheduled for delivery (i.e.. transmission) by the program supplier station. If the packet IDs associated with the requested information are not already included in the root information available to the subscriber, the program supplier station 102 also provides the subscriber with the packet IDs required to access the requested information. For information having an associated delivery charge, the subscriber's account is debited by a charge corresponding to the information requested.

In the preferred embodiment, each request is assigned a priority level (e.g., low priority night-time delivery, regular two-hour delivery, and rush half-hour delivery), and the program supplier station 102 schedules delivery of requested information accordingly. Information access charges are based both on the volume of information requested and on the request's assigned priority level. If the requested priority level is not available due to an unexpected surge in requests, the subscriber station is informed that the request priority has been downgraded and the subscriber is given the opportunity to cancel the request.

Program Supplier Station

As shown in FIG. 1, the program supplier station 102 includes the aforementioned database 112, which is typically stored on a large number of high density magnetic disk devices. The program editing software 132 on the central program supplier station 102 tags all the information in the database 112 with indices (each of which contains a packet ID plus additional information) so as to form a single hierarchical structure that encompasses the entire information database. More specifically, software 132 (executed by CPU 130) generates a hierarchical set of indices referencing all the data in the information database 112 and embeds those indices in the information database.

In an alternate embodiment, the packet IDs and the associated indices embedded in the database can be generated off line. In particular, each information provider can be assigned, in advance, a block of packet ID values. If the packet ID values are made sufficiently long, such as 64 or 96 bits long, then assigning blocks of packet ID values to information providers will not deplete the supply of such values. Each information provider is required to organize the information it wants to publish into one or more subtrees, embedding the associated indices therein, and then providing the information to be published to the information server. The information server will then "graft" the subtree(s) of information provided by each information provider onto the information hierarchy broadcast by the information server.

The program supplier station 102 includes at least one central processing unit (CPU) 130, software 132 executed by the CPU 130 for editing program materials and for scheduling delivery of both basic service information and subscriber requested data. In some embodiments, the supplier station 102 will be a distributed system utilizing many CPUs interconnected using a local area or even a wide area network. In that case, the station 102 shown in FIG. 1 represents the information collection node, which collects all the information from various programming material providers, combines, serializes and transmits the information.

Memory 133 stores, among other things, scheduling data which is used to control the timing at which each packet of information in the information database 112 is to be transmitted. As will be described below, the timing information in the schedule data is incorporated into "timestamp markers" that are transmitted along with the transmitted data, enabling subscriber stations to know in advance when selected information items will be received.

User request processor 134 is interfaced to a large number of conventional telephone lines 136, using individual modular interface cards for each telephone line so that the system is expandable. Each interface card is programmed to receive and confirm information requests from subscribers, as well as to handle subscriber account transactions such as setting up new subscriber accounts, providing data decoding keys to new subscribers, and accepting credit card and debit card payments of subscriber balances. In response to each information request received, the request processor 134 queries a subscriber database 138 to ensure that the subscriber is authorized to request additional data, sends the request to the scheduling software 132 so that the transmission of the requested information will be scheduled, and enters the corresponding charge into the subscriber's records in the subscriber database 138.

In embodiments of the invention using multiple transmission channels, so as to be able to handle larger numbers of subscriber requests, special scheduling messages are transmitted via the satellite indicating the approximate time that the requested information will be transmitted and the transmission channel that will be used. Subscriber stations waiting for requested information use this information to change the transmission channel being monitored so as to receive the requested information.

The actual data transmission is handled by a data formatting and transmission subsystem 140. This subsystem includes memory for buffering and formatting the data scheduled for transmission, as well as circuitry for encrypting, packetizing, and then serializing or streaming the data to a transmitter 142 which transmits the data stream to the subscriber stations 110 via satellite 104.

In the preferred embodiment, some of the transmitted data is encoded using conventional public key encryption methodology. Generally, decoding keys for decoding the encrypted data are given only to subscribers who pay for access to that data. For instance, whenever a subscriber requests information not included in the basic subscriber service, and for which there is an associated delivery charge, the program supplier station 102 may select a new encryption key for each request in a pseudo-random fashion, passing the corresponding decoding key to the requestor via the same telephone connection on which the request is received. Encryption and decoding keys are used in the preferred embodiment solely in conjunction with the distribution of materials published on a fee-per-purchaser basis. When multiple subscribers request the same set of materials prior to their transmission, the same encryption and decoding key can be used for all of those subscribers, thereby eliminating the need to retransmit the requested materials for each requesting subscriber.

Another type of "encryption" used in the preferred embodiment to defeat access by unauthorized subscribers to "protected data", without actually encrypting the protected data is as follows. The packet IDs associated with the protected data need not be sequential, rather they should be assigned on a pseudo-random basis. Furthermore, the packets for the requested data should be scheduled for transmission in a pseudo-random sequence, interleaved with other broadcast data packets. This method of "mixing up" the requested data, combined with the fact that at least a hundred 10KB packets are transmitted per second, will make unauthorized access to protected data extremely difficult even when the protected data is not encrypted prior to transmission.

The utility of the present invention can be further enhanced by using data compression techniques so as to increase the perceived bandwidth of the information server, and by downloading software, data compression codebooks and the like along with the transmitted information. Data compression is discussed more below.

Subscriber Receiving Stations

FIG. 2 shows an individual subscriber station 110-1 having its own satellite dish 150, low noise block receiver and signal converter (LNB) 152, receiver 153, and data filter subsystem 120. Typically, the satellite dish receives a signal having a carrier frequency on the order of 12 GHz, the LNB 152 brings this down to about 1 GHz with a signal bandwidth of about 500 MHz, and the receiver 153 then translates the received signal into a digital baseband signal. In this embodiment, the subscriber station 110-1 is a desktop computer (such as a Macintosh computer made by Apple Computer, or an IBM PC compatible computer made by any one of a large number of manufacturers) to which the satellite receiver 150-152-153 and data conversion subsystem 120 have been added. Thus, the subscriber station 110 has a CPU 154, monitor 156, keyboard 158, telephone modem 159 and other conventional computer components.

As noted above, the data filter subsystem 120 receives the incoming data stream and selects those data packets that meet selection criteria defined by the receiving station 110. The information in the selected data packets is downloaded into the memory 122-124 of the subscriber's workstation or other computer using subscriber software 160 provided by the information network supplier for that purpose. The data filter subsystem 120 is discussed in more detail below with reference to FIG. 7.

The present invention also includes the ability to automatically update the software used by subscribers' computers by transmitting the software updates along with other data transmitted by the information server, with different versions of the updated subscriber software being transmitted for each of the different platforms (i.e., types of CPUs) being used in subscribers' computers. To implement this, the subscriber stations 110 must be set up to automatically accept and download software updates of the subscriber software 160.

Figure 3:
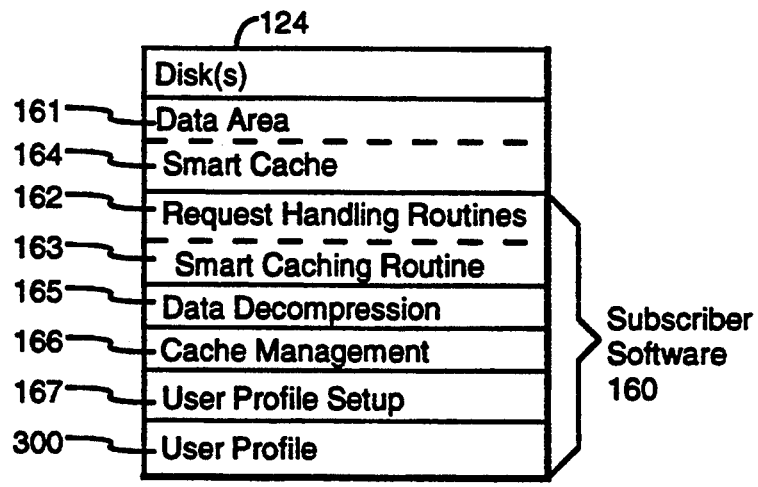
FIG. 3 depicts some of the data areas and software routines stored in the memory storage area of a subscriber station.

Referring to FIG. 3, the subscriber's data storage 124 in the preferred embodiment includes a data area 161 reserved for downloading information from the data filter subsystem 120. Depending on the memory capacity of the subscriber's data storage devices 124, this data area 161 might be as small as, perhaps, 2MB, or as large as perhaps 100MB, with a reserved data area of 10MB being more typical for an individual subscriber.

One feature of the present invention is that the subscriber software 160 has a set of subscriber request handling routines 162 which interact with the data filter subsystem 120 to arrange for downloading of the information requested by a subscriber. The request handling routines include a special "smart caching" routine 163 for anticipating future information requests by the user. Data corresponding to these anticipated information requests is downloaded into a portion 164 of the reserved data area 161 called the smart cache. Since a virtually unlimited amount of disk space could potentially be occupied by these anticipated requests, only some of which will actually be requested by the subscriber, the smart cache 164 is used as a temporary buffer, the oldest contents of which will be overwritten as information from new anticipated requests is downloaded.

The subscriber software 160 also includes a data decompression routine 165 for decoding information transmitted in compressed form, a cache management routine 166 for controlling the downloading of information into the data area 161 and determining which information in the data area 161 to delete when the area overflows, and a user profile setup program 167 which compiles a "user profile" data structure 300 that defines a default set of information to be retrieved from the transmitted data and stored in the data area 161. As noted previously, the data decompression routine used can change depending on the nature or type of data.

Figure 4:
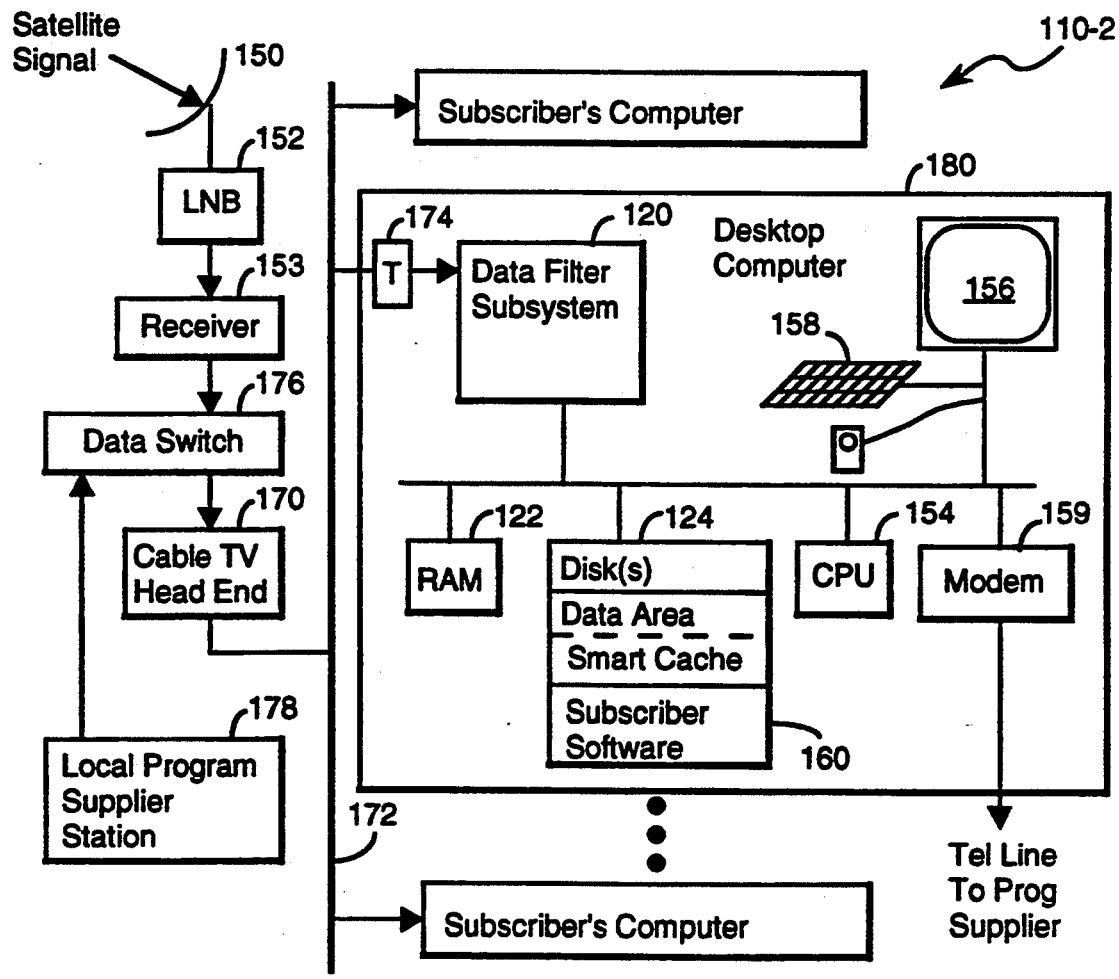
FIG. 4 is a block diagram of a system for rebroadcasting onto a cable television network the data stream received from a satellite, as well as a local information source which can insert data into the data stream in lieu of data from the satellite.
Figure 5:
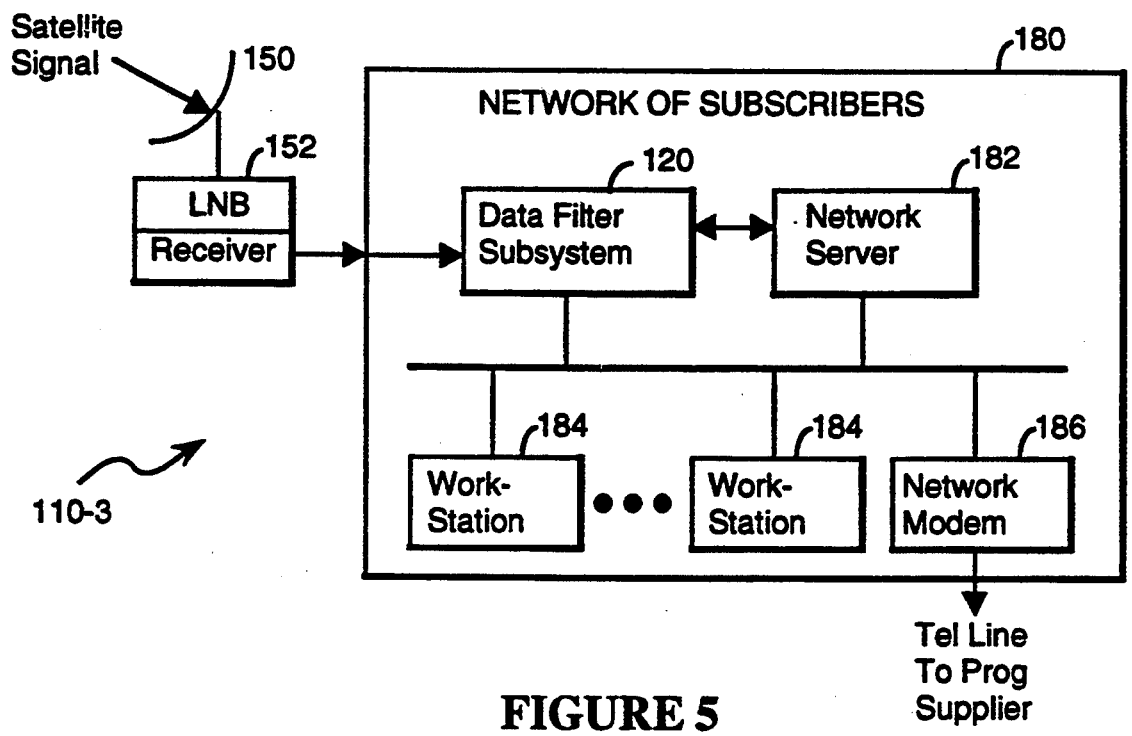
FIG. 5 is a block diagram of a local area network of subscribers.

FIGS. 4 and 5 show two alternate configurations of subscriber stations, both of which reduce the cost per subscriber for the required receiver hardware. In FIG. 4, the received satellite signal is translated by a low noise block converter (LNB) 152 to an intermediate carrier frequency of perhaps 1 GHz, which is then translated down to baseband by a receiver 153. The receiver 153 outputs a logic level bit stream that is received by a cable television (CATV) distribution plant's head end 170 and then retransmitted via cable 172 to all the subscribers of the cable television system. Subscribers to the information network connect their computers to the cable television cable 172 using a conventional tuner 174 to bring the satellite signal down to baseband. The remaining portion of each subscriber's station is the same as shown in FIG. 2. Two advantages of this system configuration are (1) that individual subscribers save the cost of having a satellite receiver 150-152, since one such receiver is sufficient to service a large number of subscribers, and (2) better reception of the satellite signal, with lower error rates, is possible since most CATV head ends have larger receiving dishes than can be afforded by individual subscribers.

An important feature of this configuration is data switch 176, which enables local programming to be added to the data stream received from the satellite. It is anticipated that a certain amount of the satellite's bandwidth will either be left unused, for instance by leaving room for 1000 locally generated data packets each time that a particular special packet is transmitted, or that a portion of the data stream will be designated as suitable for being preempted by local programming. The local program supplier station 178 is essentially a small version of central program supplier station 102 in that it must perform similar tasks—collecting information from various (presumably local) programming material providers, combining, serializing and transmitting the information during the available time slots set aside for local programming. The local programming data will also be hierarchically arranged with embedded timestamped indices, and will generally be set up as a subtree appended to a branch of the data hierarchy transmitted by the central program supplier station.

The ability to have local programming is commercially important, both because it provides the ability for local CATV stations to collect advertising revenues, which enables the data transmission service to be provided free to subscribers, and also to make the content of the transmitted data better tailored to its audience. Vastly greater information content is another result of having multiple local source transmitters. By way of example, if the local program supplier for each local CATV system provides one percent of the total traffic, and if there are one thousand such local program suppliers, the overall information content of the information distribution system is increased ten fold.

In FIG. 5, a single satellite receiver 150-152 is connected to a local area network 180 of subscribers. All requests for transmitted information are handled by a single data filter subsystem 120 and the network server 182. In other words, requests for information are routed through the network server 182 so that one data filter subsystem 120 can be used to select all the information needed by all the subscriber work stations 184 on the local area network 180. Similarly, a single modem 186 or a small number of such modems can be used by a large number of work stations 184 to submit requests to the program supplier station. A significant cost saving associated with this configuration is saved disk space —because all of the users can share access to information stored on the server's hard disk. Speed of access to data from the information service may also be improved, compared to an individual subscriber configuration, because more disk space can be dedicated to automatically caching a larger portion of the transmitted information, since the cost of the dedicated disk space is being shared by a group of users.

This system configuration also spreads the cost of the satellite receiver 150-152 and the cost of the data filter subsystem 120 over the same group of users. Since it is anticipated that the data filter subsystem 120 might sell for at least $500 (in 1991 U.S. dollars) apiece to manufacture, the local area network configuration of FIG. 5 can result in significant savings per user.

The system configuration of FIG. 5 is likely to be suitable not only for business subscribers, but also libraries, schools, kiosks at shopping malls, and other types of institutional subscribers.

Data Filter Subsystem

Figure 6:
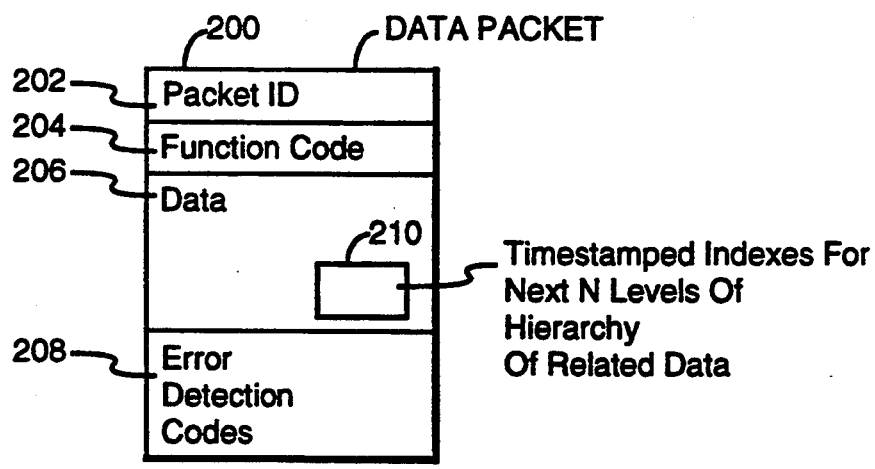
FIG. 6 is a block diagram of a data packet.

As shown in FIG. 6, each received data packet 200 begins with a packet identifier 202, followed by a function code 204 and a set of data 206, followed by error detection codes 208. Furthermore, as will be discussed below, the data 206 includes not only the information associated with the packet identifier 202, but also timestamped indices 210 for the next N (e.g., three) levels of information in the information database hierarchy.

Packet identifiers 202 are used to determine which packets require further processing, with all unselected packets simply being discarded by the subsystem 120. The function code 204 is used to identify and categorize special messages transmitted by the program supplier. The packet ID 202 and the function 204 are not encrypted, thereby allowing packets to be selected or discarded prior to processing the data 206. In the preferred embodiment, the data 206 portion of most packets is not encrypted, except for the use of data compression. A standard, commercially available error correction methodology may be used to detect and correct data errors caused by noise in the transmission process.

In some applications, data packets transmitted in response to subscriber requests will be encrypted. However, given the huge amount of data being transmitted it is impractical for a "pirate" to scan all the transmitted data for useful information. Without knowing the packet IDs for a particular set of information, and the proper order of those packet IDs for reconstructing a particular file or program, it is virtually impossible to extract useful information from the data stream, thereby making data encryption unnecessary in most cases.

Most or all of the data transmitted by the system will be transmitted in compressed form. In order to make the data compression both efficient and flexible, a general set of data decompression software is included in the subscriber software 160 (see FIG. 2) given to each subscriber, along with a default "code book" or coding algorithm to be used for the decompression process. Other code books or coding algorithms, associated with various types of transmitted data will be transmitted along with the compressed data. A typical code book, for example suitable for encoding newspaper articles, will occupy less than 50KB. When used in conjunction with megabytes of data, and taking into consideration that the compression will typically allow two-to-one or better data compression, the transmission of code-books along with the related data involves an inconsequential amount of overhead. The data decompression is performed on the subscriber's own computer, where computation time is presumably virtually free of cost. Also, data decompression is not time consuming computationally using currently available desktop computers, and will not noticeably impact the performance of the system from the viewpoint of subscribers.

Figure 7:
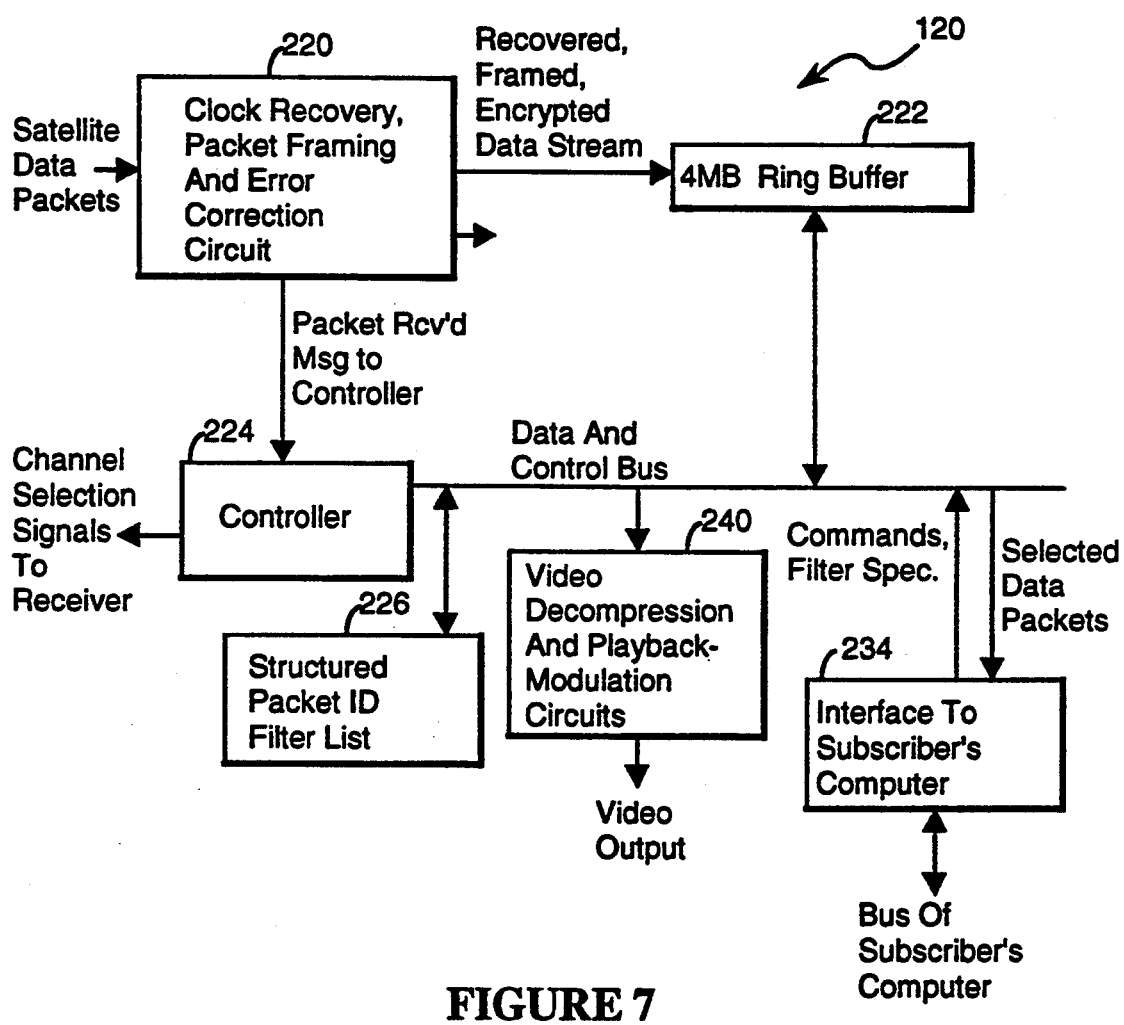
FIG. 7 is a block diagram of a data filter subsystem used in subscriber stations for receiving broadcast data and video signals.

Referring to FIG. 7 the data filter subsystem 120 used in subscriber stations to receive broadcast data works as follows. The satellite transmitted data stream, which contains a sequence of data packets, is first processed by a conventional satellite signal recovery circuit 220 that stores the received data packets in a ring buffer 222. In the preferred embodiment, the ring buffer 222 has 4 megabytes of storage, enabling about four hundred 10KB data packets or about 2.5 seconds of data at the system transmission rate to be stored. The required size of the ring buffer 222 is governed by the maximum possible delay before a selected packet is downloaded onto the subscriber's host computer.

Each time that a complete data packet is transferred by the data recovery circuit 220 to ring buffer 222, the data recovery circuit 220 sends a "packet received" message to the subsystem's controller 224. The controller 224 responds by comparing the packet's ID 202 with a list of packet ID values and/or ranges of packet ID values stored in filter list 226. Packet's which match any of the packet ID values in the filter list 226 are "selected" and downloaded to the subscriber's computer via a conventional bus interface circuit 234, such as a SCSI (Standard Computer System Interface) interface.

To stretch the time available for downloading, a modified ring buffer technique can be used in which the buffer 222 is divided into a predefined number of slots, each of which can hold one packet. Slots holding packets selected for downloading are "marked" (e.g., using a set of bit flags) and thereby prevented from being overwritten by incoming data until the packet in the slot has been downloaded and the slot unmarked.

If a substantially longer period of time is required to ensure successful downloading of the received data to the subscriber's computer, either additional random access memory can be added to the ring buffer 222, or a fast disk storage device can be added to the data filter subsystem 120 to enable larger amounts of data to be buffered by the subsystem 120. The use of disk storage device for buffering may be justified for local area networks of subscribers, primarily to avoid loss of data when the network server cannot service the subsystem 120 within a few seconds.

In embodiments of the invention which include the transmission of video or audio programming material, the video programming material is transmitted digitally, in a compressed form. Many video data compression systems are commercially available. The video program material stored in the information database 112 is stored in compressed digital form by the program supplier station 102. As a result, each data conversion subsystem could optionally include a video decompression and modulation circuit 240 for decompressing the compressed digitized video data, and then converting it back into an analog signal suitable for either playback or recording using a conventional VHS video recorder. In alternate embodiments, the received video data will be downloaded in compressed form, for example for storage on a digital tape recorder. In this alternate embodiment, the subscriber's computer will have to include a video decompression circuit. This embodiment has the advantage are reducing the storage requirement associated with digital video signal storage.

When multiple transmission channels are used by the program supplier station, the controller 224 sends control signals to the satellite receiver as to which channel should be selected. Typically, the satellite receiver will normally be tuned to a "main" or primary channel. Other channels are only selected during the expected transmission times associated with packet identifiers stored in the filter list.

Figure 8:
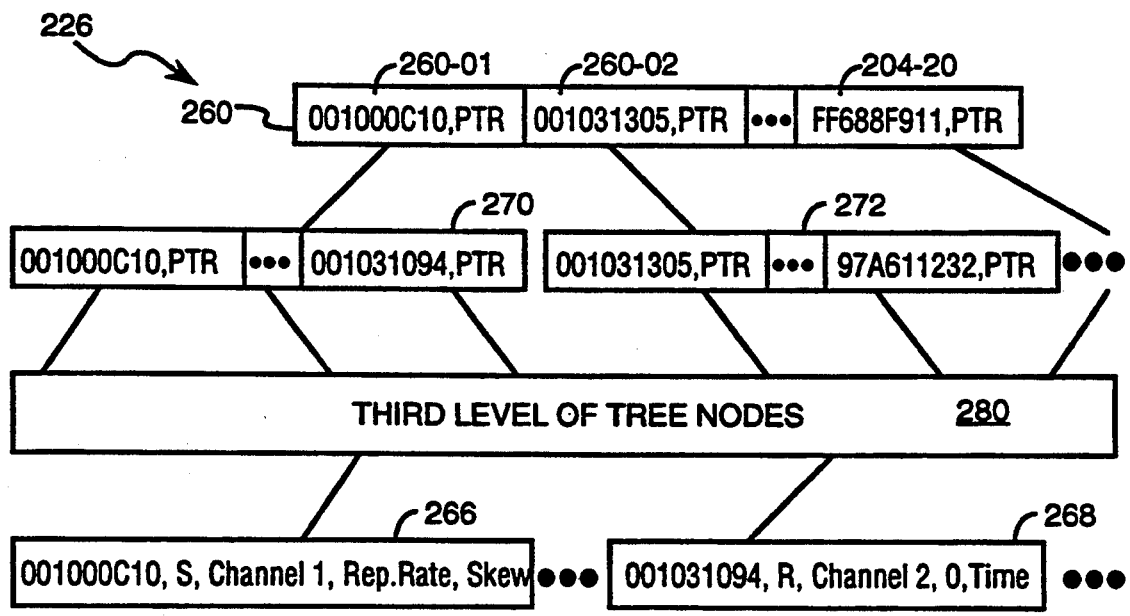
FIG. 8 depicts the data structure of the filter list used to select data packets received by a subscriber station.

Referring to FIG. 8, the "requested data" in the filter list 226 is stored as an ordinary B-tree data structure, similar to those found in almost any DBMS (database management system). At the top of the tree is a root node 260. At the bottom of the tree are leaf nodes 266, 268. In between the root 260 and the leaf nodes are intermediate nodes 270, 272, 280. B-trees are well known data structures used to quickly identify whether or not a specified key value is present in a database. In this case, a three level tree, with perhaps up to twenty entries per node, will facilitate high speed determination as to whether or not a particular packet ID is present in the filter list.

Each leaf node in the filter list contains five fields: (1) a packet ID, (2) a flag indicating whether the packet is provided as part of the basic subscriber service or whether it is a packet that has been specifically requested to be transmitted, (3) the identify of the channel on which the packet is to be transmitted, (4) a repetition rate value, which is the rate at which transmission of the packet is repeated (e.g., one time per hour, or zero for information specifically requested), and (5) a time skew value indicating the approximate time that the packet is scheduled to be transmitted within the packet's repetition tier.

To determine the approximate next time that a packet is will be transmitted, the repetition rate and time skew fields are used:

NextTime=RepPeriod*INT{CurrentTime/RepPeriod}+Time Skew where INT is the integer function. For instance, if the CurrentTime is 09:35, the RepPeriod is one hour, and the TimeSkew is 5 minutes, then the next time that the packet will be received is about 10:05. When a data packet ID in the filter list specified a channel other than the main data transmission channel, the NextTime value is used to determine when the subscriber's system should be tuned to the other specified transmission channel.

Alternately, the packet IDs for the information requested by the subscriber could be stored in a Content Address Memory (CAM), thereby providing a match-/no-match determination for each packet ID in a single clock cycle. However, the CAM can store only a limited number of selected packet IDs, while the number of packet IDs that can be stored in the B-tree structure of FIG. 8 is limited only by the amount of low-cost random access memory provided to store the filter list.

Information Data Hierarchy and Indexing

Figure 9:
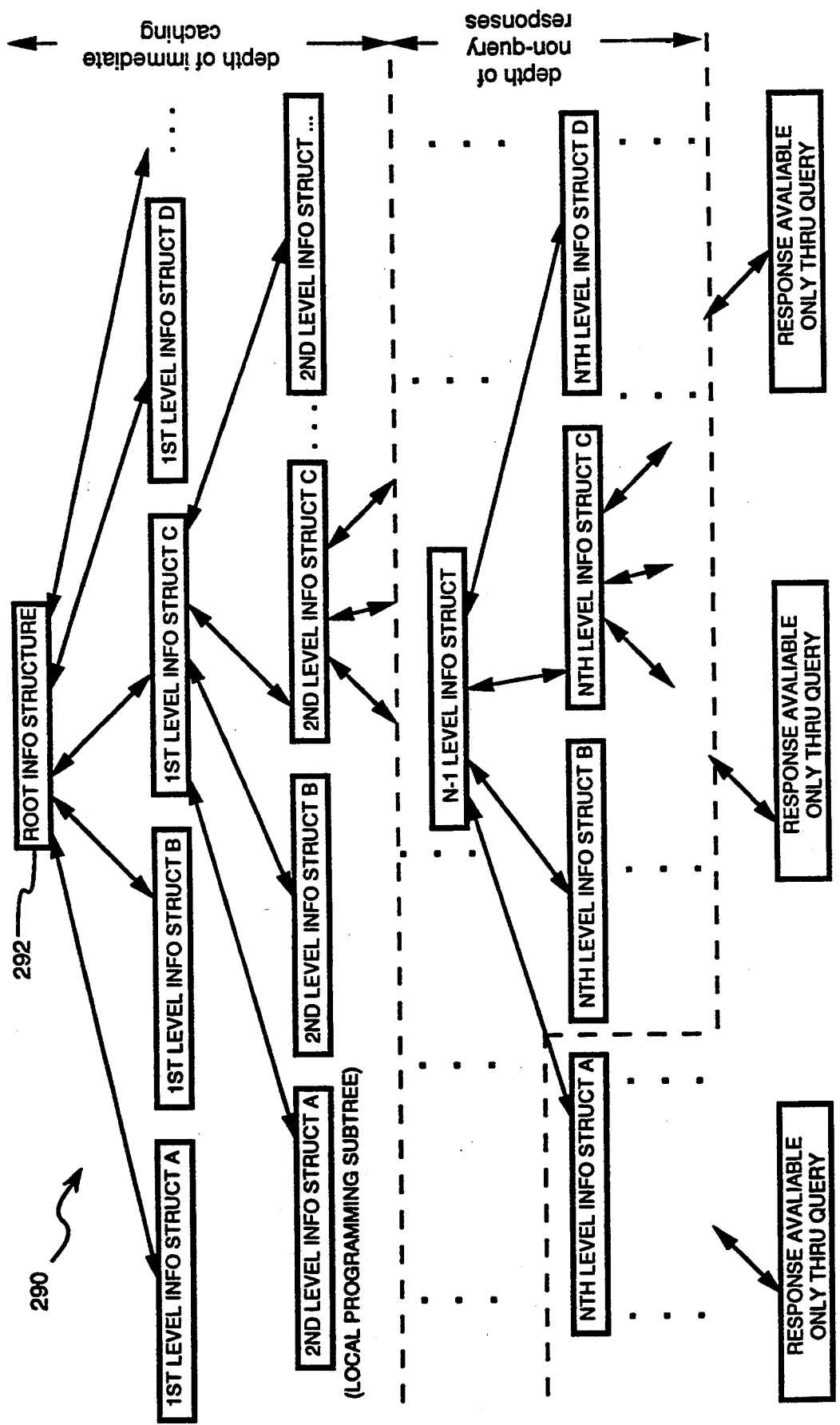
FIG. 9 depicts the hierarchical structure of the broadcast data.

Referring to FIGS. 1 and 9, all of the information in the program database 112 is hierarchically organized using a set of assigned indices to reference each distinct portion thereof. For the purposes of transmission, the database is broken into data packets each holding up to about 10,000 bytes of data. In general, each data packet has a unique packet ID, except that a contiguous and associated set of packets might be assigned a single packet ID. Sequence numbers inside the packets sharing a common packet ID can be used to ensure that the data in these packets is properly ordered after downloading into the subscriber's computer. The indices associated with reference data in the database are included in the root information, and also may be embedded in various portions of the transmitted data for the purposes of cross-referencing related information.

Referring to the hierarchy or tree data structure 290 in FIG. 9, a set of Root Information 292 is considered to be at the "top" of the hierarchy. For the purposes of this discussion, the directions "up" and "down" in the hierarchy are as shown in FIG. 9. As shown, local programming provided by a local program supplier station is typically defined as a subtree of the hierarchy. Alternately, the locally provided programming could be appended to several portions of the hierarchy 290.

Depending on the amount of disk storage space available on the subscriber's computer (or network server in the case of networks of subscribers), a certain amount of the top portion of the information hierarchy 290 will be automatically stored and updated in the subscriber's computer so that this information is always available. Depending on how the subscriber configures his computer system, this may vary anywhere from 0.25 megabytes of data to perhaps 10 megabytes of data or more.

As shown in FIG. 9, the information database is structured so that all data down to a certain depth in the hierarchy is provided as part of the basic subscriber service, while items further down the hierarchy are available only by special request. As shown in FIG. 9, the depth of information provided by the basic subscriber service may vary in different portions of the hierarchy.

The information database is also hierarchically structured in a second manner. In particular, the information included in the basic subscriber service is divided into "root information" plus several tiers of information which are transmitted at decreasing frequency. Table 1 shows an example of how the 1.5 megabyte per second bandwidth associated with a single channel transmission system may be subdivided into tiers. The information database's root information, comprising about 0.25 megabytes that provides a large part of the indexing and top level menus needed to access the information database, is retransmitted ten times per hour. The first tier of information, transmitted four times per hour, comprises 150 megabytes of information most frequently needed by subscribers. Each successively lower tier of information contains a larger amount of information than the next higher tier, prioritized in accordance with actual or expected subscriber usage, and is transmitted less often. In this example, twenty-five percent of the available bandwidth is reserved for responding to subscriber requests for additional data. It is noted that despite the high repetition rate of some of the basic subscriber service data, only 35.1% of the available bandwidth is occupied by repeated information.

TABLE 1

| Example of Data Channel Usage - 1.5 MB/Sec Channel | | | |
| --- | --- | --- | --- |
| Information Type | Repeat Rate | Megabytes Per Transmen | % of Total Bandwidth |
| Root Information | 10 times/hr | 0.250 | 00.0463 |
| 1st Priority Info | 4 times/hr | 150 | 11.1 |
| 2nd Tier Info | 1 time/hr | 600 | 11.1 |
| 3rd Tier info | 0.25 times/hr | 2,400 | 11.1 |
| 4th Tier info | 1 time/12 hrs | 7,200 | 11.1 |
| 5th Tier info | 1 time/24 hrs | 39,540 | 30.5537 |
| Subtotals - unique info | | 49,890.25 | |
| - total bytes Tx | | 97,200.00 | 75.00 |
| Data Tx by Request | N/A | 32,400 | 25.00 |
| Total | | 129,600.00 | 100.00 |

It should be emphasized that the repetition rates and other data values provided in Table 1 are only one example of how the bandwidth of a channel could be utilized. The particular repetition rates associated with each tier of data and the amount of data allocated to each tier are selectable parameters that will need to be carefully considered in order to maximize utility of the system for most subscribers.

Each publisher providing materials to be published by the system will structure that information by indicating what portions are to be placed in Tier 1, what portions are to be placed in Tier 2, and so on. Different publication costs will be associated with each tier. Material published on fee-per-copy basis, wherein a royalty must be paid to the copyright owner on a per copy basis, is transmitted only in response to specific subscriber requests.

An alternate tiering scheme to the one shown in Table 1 would be to offer publishers a semi-continuous range of repetition rates in the form of a set of perhaps 100 different repetition rates, each having an associated publication cost, with much smaller increments between tiers than the example given in Table 1. In addition, publishers would be able to specify time frames during which each subset of published information should be broadcast, thereby giving publishers a large degree of control over when their programming materials are broadcast. Of course, regardless of the repetition rate tiering scheme used, the publisher's ability to select any particular repetition rate and distribution time frame would be subject to the availability of the required transmission time. Presumably, supply and demand for time slots in the information server's transmitted data stream will be balanced by appropriate pricing policies, much in the way that advertising time is sold by radio and television broadcasters.

User Profiles For Automatic Data Retrieval

Figure 10:
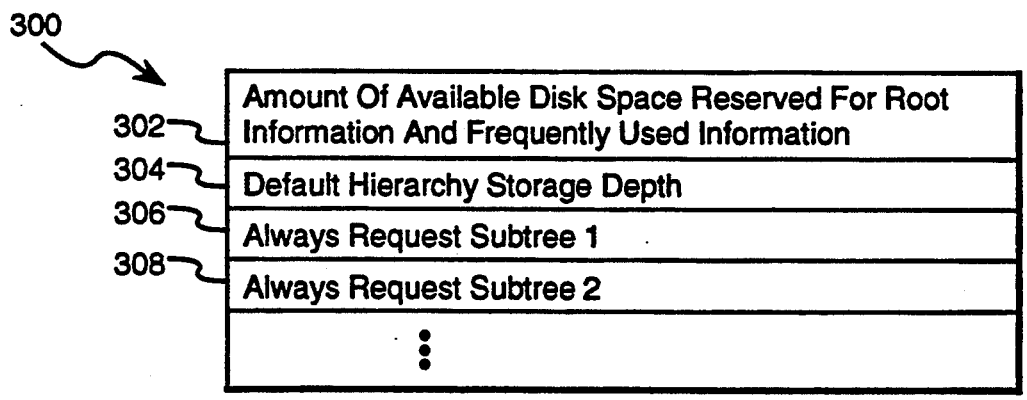
FIG. 10 is a block diagram of a "user profile" data structure which specifies data to be stored and updated in a subscriber's computer.

Referring to FIG. 10, in the preferred embodiment, each subscriber's computer compiles a "user profile" data structure 300 which defines a default filter set defining data to be stored and updated in a subscriber's computer. In particular, the user profile 300 stores a value 302 indicating the amount of disk storage space that has been reserved for storing both root information and the frequently requested information specified elsewhere in the user profile. This value 302 will typically vary from 0.25 to 10 megabytes. A depth value 304 indicates the amount of root information to be downloaded into the subscriber's computer, and items 306–308 specify portions of the information hierarchy that the subscriber wants to have stored and updated on an ongoing basis. For instance, the subscriber might specify that all information regarding certain sporting events (such as professional football games) be automatically retrieved and downloaded into his computer. Software known as "computer agents" might be employed by subscribers for the purpose of automatically searching for specified data, organizing the results, and so on.

The data in the user profile 300 is translated into specific packet ID information that is then stored in the filter list 226 (see FIG. 7) of the subscriber's data filter subsystem 120. As a result, transmitted information corresponding to the topics specified in the subscriber's user profile 300, is automatically downloaded into the subscriber's computer and is also automatically updated as the transmitted information corresponding to those topics is update. By using the "user profile" to pre-load the packet ID filter list, the subscriber's wait time for the information most frequently requested by that subscriber is reduced to zero.

Timestamped Indices and "Smart Caching" to Avoid Data Delivery Delays

Figure 11:
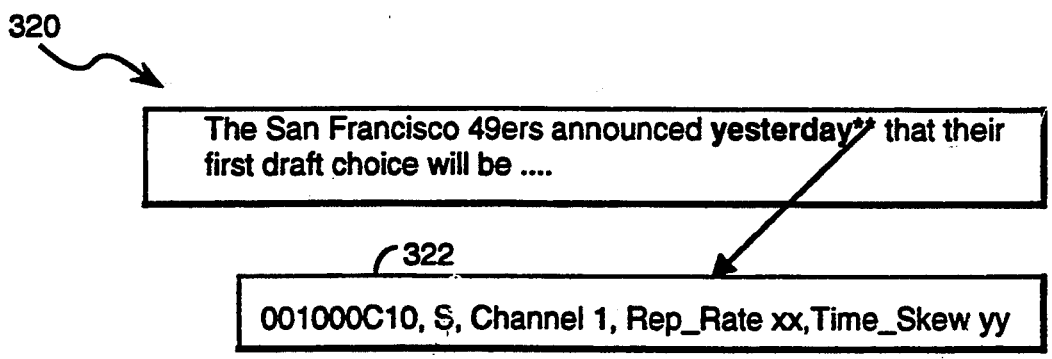
FIG. 11 depicts the index and timestamp information embedded in the broadcast data.

Referring to FIG. 11, timestamped indices 322 are embedded in the information 320 transmitted by the program supplier. These indices are embedded not only in menus, such as the top level menu shown in Table 2, but are also embedded inside the text and/or figures of the received information, thereby referencing and cross-referencing other data that is available in the database. The structure of the indices 322 is the same as shown for indices 266, 268 stored in the filter list. It important to note that each index item is timestamped (unless it references data that is transmitted only upon request) by the values in the RepRate and TimeSkew fields of the index. Using the "NextTime" computation formula shown above, the timestamp data in each index allows the user to be notified as to the amount of time it will take before a requested item will be received. Items in the received information which have an associated timestamped index are highlighted or otherwise visually distinguished. When the subscriber selects the item, the associated timestamp information is displayed, thereby informing the subscriber whether or not this is a special request item obtainable only at extra cost, and also the associated delivery wait time if the item is included in the basic subscriber service.

TABLE 2

| Example of Main Menu |
|---|
| PLEASE SELECT TOPIC/CATEGORY: |
| TODAY |

TABLE 2-continued

| Example of Main Menu |
|---|
| PLEASE SELECT TOPIC/CATEGORY: |
| Nawspapers & magazines |
| Financial |
| Catalogs |
| Government |
| Telephone Directories |
| Travel |
| Reference Books and Information |
| Other Books |
| Computer Software a Games |
| Audio Programming |
| Video Programming |
| Subscriber menus |

In accordance with the present invention, there will often be no delivery wait time for items requested by a subscriber. In particular, whenever the subscriber requests an item, the subscriber software 160 in the subscriber's system will also enter into the filter list "look ahead" requests for associated information in the information hierarchy—typically for the items in the next level or two down the hierarchy from the requested item. The extent of the look ahead requests is limited primarily by the amount of disk storage space available in the subscriber's computer. Since it will often take the subscriber a couple of minutes to examine the information obtained from a request, the data from the look ahead requests will often be received before the subscriber actually requests them.

The data corresponding to the "look ahead" requests entered in the subscriber's filter list are stored, when received, on the subscriber's computer's hard disk (or other comparable mass storage device). In the preferred embodiment, a portion of the subscriber's hard disk is set aside as a "smart cache" (see FIG. 3) specifically for "caching" of these look ahead requests. When and if the subscriber requests any of the data in the smart cache, it is available for immediate access by the subscriber. If desired, the selected data in the smart cache can be moved to other areas of the user's hard disk. Unused data in the smart cache is overwritten with new data as required by other received data corresponding to look ahead requests.

Video Programming

The transmission of video programming is a classic problem in that it tends to occupy large amounts of bandwidth. The typical byte count for an hour of video programming, using available data compression techniques that do not noticeably degrade the quality of the program, is about 0.9 gigabytes, which is equivalent to about 15MB per minute.

Due to the large amounts of data associated with video programming, in the preferred embodiment most video programming is transmitted on a separate channel. Using a preferred data transmission rate of 1.5MB per second, which is equivalent to 90MB per minute, it is possible to use time multiplexing so as to transmit six video programs (each having an associated data rate of 15MB per minute) simultaneously. In addition to using time multiplexing, a data tiering arrangement similar to the one shown in Table 1 can be used, whereby certain types of video programming are repeated more frequently than others.

Alternately, since the data rate of the channel is higher than the data rate required for any one video program, it would be possible to transmit a video program in a fraction of the playback time associated with the program. However, it is anticipated that many subscriber's data receiver systems will not be able to receive and store downloaded data at a sustained rate of 1.5MB per second (i.e., for a sustained period of time in excess of, say, two or three seconds). If the received video programming data is being recorded in a typical subscriber station on a tape recorder, then the multiplexing rate used for transmission would be selected so as to match the data recording rates of such tape recorders.

It is anticipated that at least some subscriber's will be interested solely in receiving video programming from the data transmission system. For such subscribers, the subscriber's "computer" will actually be a data storage box which operates in much the same manner as a conventional video cassette recorder. For these systems, the data filter system would be preprogrammed to store all hierarchy information related to video programs. On screen menus would be displayed to allow the subscriber to select programs. The timestamp information embedded in the hierarchy information would be used to inform the subscriber as to when the selected programs would be received. Packet ID values corresponding to the selected programs would be stored in the filter list and the selected programs would be stored, generally on tape, for later viewing by the user.

Potential Publishers

The data transmission system of the present invention is suitable as a publication medium for a wide range of potential publishers, including both publishers who wish to disseminate information for free and for publishers who wish to charge for each copy disseminated. The potential publishers include industrial suppliers (product data, catalogs, product information), software publishers (computer software and games, video and audio programming), catalog sales companies (text and pictures), advertisers, real estate sellers, travel packages, publishers of reference materials or subscription based materials, and many others whose information changes relatively often or who wish to have low cost distribution to large numbers of customers.

Alternate Embodiments

Many aspects of the above described preferred embodiment might be modified to accommodate various commercial and technical requirements. For instance, dedicated optical fiber channels might used to transmit data from a national, or one or more regional, program supplier stations, to cable television transmission stations distributed over a wide geographic area. Certainly, the data transmission rates used by the system are totally dependent on the particular transmission medium used and the maximum acceptable cost for each subscriber's data filter subsystem.

Numerous minor technical choices in the design of the system can be changed without affecting the overall merit of the data transmission system. For instance, in place of a standard, commercial error correction methodology, a proprietary error correction methodology could be used if there were a reason to do so.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An information transmission system comprising:

a set of one or more computer memory devices on which is stored an information database;

database editing means, coupled to said one or more computer memory devices, for generating a hierarchically arranged set of indices for referencing data in said information database, including distinct indices for referencing distinct portions thereof, and for embedding said indices in said information database;

a transmission scheduler for scheduling transmission of selected portions of said information database, including assigning each selected portion of said information database one or more scheduled transmission times;

a transmitter, coupled to said transmission scheduler and said one or more computer memory devices, for transmitting a stream of data packets containing said selected portions of said information database in accordance with said scheduled transmission times;

said transmission scheduler dividing said selected portions of said information database into a prioritized set of tiers, wherein all the selected portions of said information database in each tier are transmitted at a corresponding repetition rate, wherein the repetition rate for higher priority tiers is higher than the repetition rate for lower priority tiers; and subscriber stations that receive said transmitted stream of data packets, each subscriber station including a data filter that stores filter data corresponding to a subset of said indices, said filter data specifying a set of requested data packets which comprising a subset of said transmitted data packets, and that downloads into a memory storage device those of said received data packets which match said specified set of requested data packets.

2. The information transmission system of claim 1, wherein said set of indices include timestamps therein indicating when each said portion of the information database referenced by an index is scheduled to be transmitted; and said subscriber stations including data processing apparatus that decodes said timestamps in said indices;

whereby subscribers can be informed as to when a specified portion of the information database will be received.

3. The information transmission system of claim 2, wherein each timestamp includes a repetition rate value indicating how often the associated portion of the information database is transmitted, and a time skew value indicating in conjunction with said repetition rate value a scheduled transmission time for the associated portion of the information database.

4. The information transmission system of claim 3, wherein the timestamp in indices referencing portions of the information database not scheduled for transmission is null, indicating that said referenced portions of the information database are transmitted only upon request by subscribers.

5. The information transmission system of claim 1, said transmitter including a central program transmission station that transmits said stream of data packets, and one or more cable television systems that receive the transmitted stream of data packets and retransmit said stream of data packets via cables to a set of subscribers, said central program transmission station further transmitting in said stream of data packets special data packets indicating where in said stream of data packets local programming data packets may be inserted; and one or more of said cable television systems including a data switch for inserting into the stream of retransmitted data packets local programming data packets at positions in said stream of data packets indicated by said special data packets.

6. The information transmission system of claim 1, said transmitter including a central program transmission station that transmits said stream of data packets, and one or more cable television systems that receive the transmitted stream of data packets and retransmit said stream of data packets via cables to a set of subscribers, said central program transmission station furthermore transmitting in said stream of data packets special data packets designated as suitable for pre-emption by local programming; and one or more of said cable television systems includes a data switch for inserting into the stream of retransmitted data packets additional "local programming" data packets so as to pre-empt said special data packets designated as suitable for pre-emption.

7. The information transmission system of claim 1, wherein a portion of the transmission bandwidth available to said transmitter is reserved for transmitting portions of said information database requested by subscribers;

said information transmission system including a subscriber request receiver that receives requests from subscribers, said requests each specifying a portion of said information database; and said transmission scheduler also scheduling transmission of requested portions of said information database.

8. The information transmission system of claim 1, wherein one or more subsets of said subscriber stations are interconnected via a local area network, including a network server that receives said transmitted stream of data packets on behalf of an associated set of subscriber stations, said network server including a data filter that references a specified set of data packets, said specified set of data packets representing data packets requested by said associated set of subscriber stations, and that downloads into a memory storage device those of said received data packets which match said specified set of requested data packets;

whereby overhead associated with receiving the stream of data packets and downloading for storage a specified subset thereof is shared by a set of subscribers.

9. The information transmission system of claim 1, wherein said transmitter transmits said data packets using multiple transmission channels; and said subscriber stations include receiver apparatus for receiving data packets for each of said multiple transmission channels.

10. The information transmission system of claim 9, wherein said information database includes video program materials as well as non-video information;

said transmitter transmits data packets containing at least selected portions of said video program materials on at least one of said multiple transmission channels and transmits primarily non-video information on at least one other one of said multiplicity of transmission channels; and a multiplicity of said subscriber stations include means for receiving and storing video program materials.

11. The information transmission system of claim 1, said data filter comprising a buffer for temporarily storing received data packets, a filter list storage device for storing said filter data referencing said specified set of requested data packets, and data processing circuitry for comparing said data packets temporarily stored in said buffer with said filter data and then forwarding those data packets in said buffer which match said filter data to a predefined destination;

whereby each subscriber station receives all transmitted data packets but forwards only requested data packets to said predefined destination.

12. The information transmission system of claim 1, said subscriber stations including data processing apparatus that automatically specifies additional data packets to be downloaded, wherein said requested data packets and said additional data packets each have associated indices at defined positions in said hierarchically arranged set of indices and said additional data packets are selected using predefined criteria with regard to said defined positions of their associated indices relative to the defined positions of said requested data packets;

whereby said subscriber station automatically downloads data packets containing data related to data contained in requested data packets, thereby anticipating potential additional requests that a user may make and speeding access thereto.

13. An information transmission system, comprising:

a set of one or more computer memory devices on which is stored an information database;

database editing means, coupled to said one or more computer memory devices, for generating a set of indices for referencing data in said information database, including distinct indices for referencing distinct portions thereof, and for embedding said indices in said information database; said database editing means further embedding in said information database cross-referencing indices for cross-referencing related information;

a transmitter, coupled to said one or more computer memory devices, for transmitting a stream of data packets containing selected portions of said information database; and a multiplicity of subscriber stations for receiving said transmitted stream of data packets, each subscriber station including a data filter that stores filter data corresponding to a subset of said indices, said filter data specifying a set of requested data packets which comprises a subset of said transmitted data packets, and that downloads into a memory storage device those of said received data packets which match said specified set of requested data packets;

said subscriber stations including data processing apparatus that automatically adds, in accordance with predefined criteria, data corresponding to ones of said cross-referencing indices embedded in said downloaded data packets to said filter data so as to specify additional data packets to be downloaded;

whereby said subscriber station automatically downloads data packets containing data related to data contained in requested data packets, thereby anticipating potential additional requests that a user may make and speeding access thereto, wherein said set of indices include timestamps therein indicating when each said portion of the information database referenced by an index is to be transmitted; and said subscriber stations's data processing apparatus furthermore decoding said timestamps in said indices;

whereby subscribers can be informed as to when a specified portion of the information database will be received.

14. The information transmission system of claim 13, wherein each timestamp includes a repetition rate value indicating how often the associated portion of the information database is transmitted, and a time skew value indicating in conjunction with said repetition rate value a transmission time for the associated portion of the information database.

15. The information transmission system of claim 14, further including a transmission scheduler for scheduling transmission of selected portions of said information database, including assigning each selected portion of said information database one or more scheduled transmission times;

wherein the timestamp in indices referencing portions of the information database not scheduled for transmission is null, indicating that said referenced portions of the information database are transmitted only upon request by subscribers.

16. An information transmission method comprising the steps of:

storing an information database on one or more memory devices;

generating and storing on said memory devices a hierarchically arranged set of indices for referencing data in said information database, including distinct indices for referencing distinct portions thereof, and embedding said indices in said information database;

scheduling transmission of selected portions of said information database, including assigning each selected portion of said information database one or more scheduled transmission times;

transmitting a stream of data packets containing said selected portions of said information database in accordance with said scheduled transmission times;

said scheduling step including dividing said selected portions of said information database into a prioritized set of tiers, wherein all the selected portions of said information database in each tier are transmitted at a corresponding repetition rate, wherein the repetition rate for higher priority tiers is higher than the repetition rate for lower priority tiers;

receiving said transmitted stream of data packets at subscriber stations;

at each subscriber stations, storing filter data corresponding to a subset of said indices, said filter data specifying a set of requested data packets which comprises a subset of said transmitted data packets; and at each subscriber station, downloading into a memory storage device those of said received data packets which match said specified set of requested data packets.

17. The information transmission method of claim 16, wherein said generating step generates indices including timestamps therein, said timestamps indicating when each said portion of the information database referenced by an index is scheduled to be transmitted;

said method including decoding said timestamps in said indices at said subscriber stations;

whereby subscribers can be informed as to when a specified portion of the information database will be received.

18. The information transmission method of claim 17, wherein each timestamp includes a repetition rate value indicating how often the associated portion of the information database is transmitted, and a time skew value indicating in conjunction with said repetition rate value a scheduled transmission time for the associated portion of the information database.

19. The information transmission system of claim 17, wherein the timestamp in indices referencing portions of the information database not scheduled for transmission is null, indicating that said referenced portions of the information database are transmitted only upon request by subscribers.

20. The information transmission method of claim 16, wherein said transmitting step includes transmitting said stream of data packets to one or more cable television systems that receive the transmitted stream of data packets and retransmit said stream of data packets via cables to a set of subscribers.

21. The information transmission method of claim 20, wherein one or more of said cable television systems inserts into the stream of retransmitted data packets additional "local programming" data packets.

22. The information transmission method of claim 16, wherein said scheduling step includes reserving a portion of transmission bandwidth available for said transmitting step for transmitting portions of said information database requested by subscribers;

said method including receiving requests from subscribers, said requests each specifying a portion of said information database; and said scheduling step including scheduling transmission of requested portions of said information database.

23. The information transmission method of claim 16, wherein one or more subsets of said subscriber stations are interconnected via a local area network including a network server;

said method including receiving at said network server said transmitted stream of data packets on behalf of an associated set of subscriber stations, storing data in said network server referencing a specified set of data packets requested by said associated set of subscriber stations, and downloading into a memory storage device associated with said network server those of said received data packets which match said specified set of requested data packets;

whereby overhead associated with receiving the stream of data packets and downloading for storage a specified subset thereof is shared by a set of subscribers.

24. The information transmission method of claim 16, wherein said transmitting step transmits said data packets using multiple transmission channels; and said receiving step includes receiving data packets from selected ones of said multiple transmission channels.

25. The information transmission method of claim 24, wherein said information database includes video program materials as well as non-video information;

said transmitting step transmits data packets containing at least selected portions of said video program materials on at least one of said multiple transmission channels and transmits primarily non-video information on at least one other one of said multiplicity of transmission channels; and at a multiplicity of said subscriber stations, receiving and storing video program materials.

26. The information transmission method of claim 16, said receiving and downloading steps including:

at each subscriber stations, temporarily storing received data packets in a buffer, storing a filter list comprising said filter data referencing said specified set of requested data packets, comparing said data packets temporarily stored in said buffer with said filter data and then forwarding those data packets in said buffer which match said filter data to a predefined destination;

whereby each subscriber station receives all transmitted data packets but forwards only requested data packets to said predefined destination.

27. The information transmission method of claim 16, said storing filter data step furthermore including automatically specifying additional data packets to be downloaded, wherein said requested data packets and said additional data packets each have associated indices at defined positions in said hierarchically arranged set of indices and said additional data packets are selected using predefined criteria with regard to said defined positions of their associated indices relative to the defined positions of said requested data packets;

whereby said subscriber station automatically downloads data packets containing data related to data contained in requested data packets, thereby anticipating potential additional requests that a user may make and speeding access thereto.

28. An information transmission method comprising the steps of:

storing an information database on one or more memory devices;

generating and storing on said memory devices a set of indices for referencing data in said information database, including distinct indices for referencing distinct portions thereof, and embedding said indices in said information database; said storing step further including embedding in said information database cross-referencing indices for cross-referencing related information;

transmitting a stream of data packets containing selected portions of said information database;

receiving said transmitted stream of data packets at subscriber stations;

at each subscriber station, storing filter data corresponding to a subset of said indices, said filter data specifying a set of requested data packets which comprises a subset of said transmitted data packets;

at each subscriber station, downloading into a memory storage device those of said received data packets which match said specified set of requested data packets; and said storing filter data step furthermore including automatically adding, in accordance with predefined criteria, data corresponding to ones of said cross-referencing indices embedded in said downloaded data packets to said filter data so as to specify additional data packets to be downloaded;

whereby said subscriber station automatically downloads data packets containing data related to data contained in requested data packets, thereby anticipating potential additional requests that a user may make and speeding access thereto;

wherein said generating step generates indices including timestamps therein, said timestamps indicating when each said portion of the information database referenced by an index is to be transmitted;

said method including decoding said timestamps in said indices at said subscriber stations;

whereby subscribers can be informed as to when a specified portion of the information database will be received.

29. The information transmission method of claim 28, wherein each timestamp includes a repetition rate value indicating how often the associated portion of the information database is transmitted, and a time skew value indicating in conjunction with said repetition rate value a transmission time for the associated portion of the information database.

30. The information transmission system of claim 29, scheduling transmission of selected portions of said information database, including assigning each selected portion of said information database one or more scheduled transmission times;

wherein the timestamp in indices referencing portions of the information database not scheduled for transmission is null, indicating that said referenced portions of the information database are transmitted only upon request by subscribers.

31. An information transmission system comprising:

a set of one or more computer memory devices on which is stored an information database;

database editing means, coupled to said one or more computer memory devices, for generating a set of indices for referencing data in said information database, including distinct indices for referencing distinct portions thereof, and for embedding said indices in said information database; said database editing means further embedding in said information database cross-referencing indices for cross-referencing related information;

a transmitter, coupled to said one or more computer memory devices, for transmitting a stream of data packets containing selected portions of said information database; and a multiplicity of subscriber stations for receiving said transmitted stream of data packets, each subscriber station including a data filter that stores filter data corresponding to a subset of said indices, said filter data specifying a set of requested data packets which comprises a subset of said transmitted data packets, and that downloads into a memory storage device those of said received data packets which match said specified set of requested data packets;

said subscriber stations including data processing apparatus that automatically adds, in accordance with predefined criteria, data corresponding to ones of said cross-referencing indices embedded in said downloaded data packets to said filter data so as to specify additional data packets to be downloaded;

whereby said subscriber station automatically downloads data packets containing data related to data contained in requested data packets, thereby anticipating potential additional requests that a user may make and speeding access thereto;

wherein one or more subsets of said subscriber stations are interconnected via a local area network, including a network server that receives said transmitted stream of data packets on behalf of an associated set of subscriber stations, said network server including a data filter that references a specified set of requested data packets, said specified set of requested data packets representing all data packets requested by said associated set of subscriber stations, and that downloads into a memory storage device those of said received data packets which match said specified set of requested data packets;

said network server including data processing apparatus that adds, in accordance with predefined criteria, data packets corresponding to ones of said cross-referencing indices embedded in said downloaded data packets to said set of requested data packets so as to specify additional data packets to be downloaded;

said network server including memory caching means for storing in a memory cache said additional data packets until said memory cache is full, and then overwriting ones of said additional data packets that have not been accessed by any of said associated set of subscriber stations with subsequently received ones of said additional packets;

whereby overhead associated with receiving the stream of data packets and downloading for storage a specified subset thereof is shared by a set of subscribers.

32. An information transmission system comprising:

a set of one or more computer memory devices on which is stored an information database;

database editing means, coupled to said one or more computer memory devices, for generating a set of indices for referencing data in said information database, including distinct indices for referencing distinct portions thereof, and for embedding said indices in said information database; said database editing means further embedding in said information database cross-referencing indices for cross-referencing related information;

a transmitter, coupled to said one or more computer memory devices, for transmitting a stream of data packets containing selected portions of said information database; and a multiplicity of subscriber stations for receiving said transmitted stream of data packets, each subscriber station including a data filter that stores filter data corresponding to a subset of said indices, said filter data specifying a set of requested data packets which comprises a subset of said transmitted data packets, and that downloads into a memory storage device those of said received data packets which match said specified set of requested data packets;

said subscriber stations including data processing apparatus that automatically adds, in accordance with predefined criteria, data corresponding to ones of said cross-referencing indices embedded in said downloaded data packets to said filter data so as to specify additional data packets to be downloaded;

whereby said subscriber station automatically downloads data packets containing data related to data contained in requested data packets, thereby anticipating potential additional requests that a user may make and speeding access thereto;

wherein one or more subsets of said subscriber stations are interconnected via a local area network, including a network server that receives said transmitted stream of data packets on behalf of an associated set of subscriber stations, said network server including a data filter that references a specified set of requested data packets, said specified set of requested data packets representing all data packets requested by said associated set of subscriber stations, and that downloads into a memory storage device those of said received data packets which match said specified set of requested data packets;

said network server including data processing apparatus that adds, in accordance with predefined criteria, data packets corresponding to ones of said cross-referencing indices embedded in said downloaded data packets to said set of requested data packets so as to specify additional data packets to be downloaded;

said network server including memory caching means for storing in a memory cache said additional data packets until said memory cache is full, and then overwriting ones of said additional data packets with subsequently received ones of said additional packets in accordance with predefined criteria;

whereby overhead associated with receiving the stream of data packets and downloading for storage a specified subset thereof is shared by a set of subscribers.

33. An information transmission method comprising the steps of:

storing an information database on one or more memory devices;

generating and storing on said memory devices a set of indices for referencing data in said information database, including distinct indices for referencing distinct portions thereof, and embedding said indices in said information database; said storing step further including embedding in said information database cross-referencing indices for cross-referencing related information;

transmitting a stream of data packets containing selected portions of said information database;

receiving said transmitted stream of data packets at subscriber stations;

at each subscriber station, storing filter data corresponding to a subset of said indices, said filter data specifying a set of requested data packets which comprises a subset of said transmitted data packets;

at each subscriber station, downloading into a memory storage device those of said received data packets which match said specified set of requested data packets; and said storing filter data step furthermore including automatically adding, in accordance with predefined criteria, data corresponding to ones of said cross-referencing indices embedded in said downloaded data packets to said filter data so as to specify additional data packets to be downloaded;

whereby said subscriber station automatically downloads data packets containing data related to data contained in requested data packets, thereby anticipating potential additional requests that a user may make and speeding access thereto;

wherein one or more subsets of said subscriber stations are interconnected via a local area network including a network server;

said method including receiving at said network server said transmitted stream of data packets on behalf of an associated set of subscriber stations, storing filter data in said network server referencing a set of requested data packets, said filter data representing data packets requested by said associated set of subscriber stations, and downloading into a memory storage device associated with said network server those of said received data packets which match said specified set of requested data packets;

said network server further adding, in accordance with predefined criteria, data corresponding to ones of said cross-referencing indices embedded in said downloaded data packets to said filter data stored by said network server so as to specify additional data packets to be downloaded;

said network server storing in memory cache said additional data packets until said memory cache is full, and then overwriting ones of said additional data packets that have not been accessed by any of said associated set of subscriber stations with subsequently received ones of said additional packets;

whereby overhead associated with receiving the stream of data packets and downloading for storage a specified subset thereof is shared by a set of subscribers.

34. An information transmission method comprising the steps of:

storing an information database on one or more memory devices;

generating and storing on said memory devices a set of indices for referencing data in said information database, including distinct indices for referencing distinct portions thereof, and embedding said indices in said information database; said storing step further including embedding in said information database cross-referencing indices for cross-referencing related information;

transmitting a stream of data packets containing selected portions of said information database;

receiving said transmitted stream of data packets at subscriber stations;

at each subscriber station, storing filter data corresponding to a subset of said indices, said filter data specifying a set of requested data packets which comprises a subset of said transmitting data packets;

at each subscriber station, downloading into a memory storage device those of said received data packets which match said specified set of requested data packets; and said storing filter data step furthermore including automatically adding, in accordance with predefined criteria, data corresponding to ones of said cross-referencing indicing embedded in said downloaded data packets to said filter data so as to specify additional data packets to be downloaded;

whereby said subscriber station automatically downloads data packets containing data related to data contained in requested data packets, thereby anticipating potential additional requests that a user may make and speeding access thereto;

wherein one or more subsets of said subscriber stations are interconnected via a local area network including a network server;

said method including receiving at said network server said transmitted stream of data packets on behalf of an associated set of subscriber stations, storing filter data in said network server referencing a set of requested data packets, said filter data representing data packets requested by said associated set of subscriber stations, and downloading into a memory storage device associated with said network server those of said received data packets which match said specified set of requested data packets;

said network server further adding, in accordance with predefined criteria, data corresponding to ones of said cross-referencing indices embedded in said downloaded data packets to said filter data stored by said network server so as to specify additional data packets to be downloaded;

said network server storing in memory cache said additional data packets until said memory cache is full, and then overwriting ones of said additional data packets with subsequently received ones of said additional packets in accordance with predefined criteria;

whereby overhead associated with receiving the stream of data packets and downloading for storage a specified subset thereof is shared by a set of subscribers.

35. An information transmission system, comprising:

a set of one or more computer memory devices on which is stored an information database;

database editing means, coupled to said one or more computer memory devices, for generating a set of indices for referencing data in said information database, including distinct indices for referencing distinct portions thereof, and for embedding said indices in said information database;

transmission scheduler for scheduling transmission of selected portions of said information database, including assigning each selected portion of said information database a transmission repetition rate and one or more scheduled transmission times in accordance with said assigned repetition rate;

a transmitter, coupled to said transmission scheduler and said one or more computer memory devices, for transmitting a stream of data packets containing said selected portions of said information database in accordance with said scheduled transmission times;

subscriber stations that receive said transmitted stream of data packets, each subscriber station including data filter that stores filter data corresponding to a subset of said indices, said filter data specifying a set of requested data packets which comprises a subset of said transmitted data packets, and that downloads into a memory storage device those of said received data packets which match said specified set of requested data packets;

said transmitter including a central program transmission station that transmits said stream of data packets, and one or more cable television systems that receive the transmitted stream of data packets and retransmit said stream of data packets via cables to a set of subscribers, said central program transmission station further transmitting in said stream of data packets special data packets indicating where in said stream of data packets local programming data packets may be inserted; and one or more of said cable television systems including a data switch for inserting into the stream of retransmitting data packets local programming data packets at positions in said stream of data packets indicated by said special data packets.

36. An information transmission system, comprising:

a set of one or more computer memory devices on which is stored an information database;

database editing means, coupled to said one or more computer memory devices, for generating a set of indices for referencing data in said information database, including distinct indices for referencing distinct portions thereof, and for embedding said indices in said information database;

transmission scheduler for scheduling transmission of selected portions of said information database, including assigning each selected portion of said information database a transmission repetition rate and one or more scheduled transmission times in accordance with said assigned repetition rate;

a transmitter, coupled to said transmission scheduler and said one or more computer memory devices, for transmitting a stream of data packets containing said selected portions of said information database in accordance with said scheduled transmission times;

subscriber stations that receive said transmitted stream of data packets, each subscriber station including data filter that stores filter data corresponding to a subset of said indices, said filter data specifying a set of requested data packets which comprises a subset of said transmitted data packets, and that downloads into a memory storage device those of said received data packets which match said specified set of requested data packets;

said transmitter including a central program transmission station that transmits said stream of data packets, and one or more cable television systems that receive the transmitted stream of data packets and retransmit said stream of data packets via cables to a set of subscribers, said central program transmission station further transmitting in said stream of data packets special data packets designated as suitable for pre-emption by local programming; and one or more of said cable television systems includes means for inserting into the stream of retransmitted data packets additional "local programming" data packets so as to pre-empt said special data packets designated as suitable for pre-emption.

37. An information transmission system, comprising:

a set of one or more computer memory devices on which is stored an information database;

database editing means, coupled to said one or more computer memory devices, for generating a set of indices for referencing data in said information database, including distinct indices for referencing distinct portions thereof, and for embedding said indices in said information database;

transmission scheduler for scheduling transmission of selected portions of said information database, including assigning each selected portion of said information database a transmission repetition rate and one or more scheduled transmission times in accordance with said assigned repetition rate;

a transmitter, coupled to said transmission scheduler and said one or more computer memory devices, for transmitting a stream of data packets containing said selected portions of said information database in accordance with said scheduled transmission times;

subscriber stations that receive said transmitted stream of data packets, each subscriber station including data filter that stores filter data corresponding to a subset of said indices, said filter data specifying a set of requested data packets which comprises a subset of said transmitted data packets, and that downloads into a memory storage device those of said received data packets which match said specified set of requested data packets;

wherein said transmission scheduler reserves transmission times for transmitting portions of said information database requested by subscribers;

said information transmission system including a subscriber request receiver that receives requests from subscribers, said requests each specifying a portion of said information database; and said transmitter further transmitting said requested portions of said information database during said reserved transmission times.

38. An information transmission system, comprising:

a set of one or more computer memory devices on which is stored an information database;

database editing means, coupled to said one or more computer memory devices, for generating a set of indices for referencing data in said information database, including distinct indices for referencing distinct portions thereof, and for embedding said indices in said information database;

transmission scheduler for scheduling transmission of selected portions of said information database, including assigning each selected portion of said information database a transmission repetition rate and one or more scheduled transmission times in accordance with said assigned repetition rate;

a transmitter, coupled to said transmission scheduler and said one or more computer memory devices, for transmitting a stream of data packets containing said selected portions of said information database in accordance with said scheduled transmission times;

subscriber stations that receive said transmitted stream of data packets, each subscriber station including data filter that stores filter data corresponding to a subset of said indices, said filter data specifying a set of requested data packets which comprises a subset of said transmitted data packets, and that downloads into a memory storage device those of said received data packets which match said specified set of requested data packets;

wherein one or more subsets of said subscriber stations are interconnected via a local area network, including a network server that receives said transmitted stream of data packets on behalf of an associated set of subscriber stations, said network server including a data filter that references a set of requested data packets, said set of requested data packets representing data packets requested by said associated set of subscriber stations, and that downloads into a memory storage device those of said received data packets which match said specified set of requested data packets;

said database editing means further embedding in said information database cross-referencing indices for cross-referencing related information;

said network server including data processing apparatus that adds, in accordance with predefined criteria, data packets corresponding ones of said cross-referencing indices embedded in said downloaded data packets to said set of requested data packets so as to specify additional data packets to be downloaded;

whereby overhead associated with receiving the stream of data packets and downloading for storage a specified subset thereof is shared by a set of subscribers.

39. An information transmission method comprising the steps of:

storing an information database on one or more memory devices;

generating and storing on said memory devices a set of indices for referencing data in said information database, including distinct indices for referencing distinct portions thereof, and embedding said indices in said information database;

scheduling transmission of selected portions of said information database, including assigning each selected portion of said information database a transmission repetition rate and one or more scheduled transmission times in accordance with said assigned repetition rate;

transmitting a stream of data packets containing said selected portions of said information database in accordance with said scheduled transmission times;

receiving said transmitted stream of data packets at subscriber stations;

at each subscriber station, storing filter data corresponding to a subset of said indices, said filter data specifying a set of requested data packets which comprises a subset of said transmitted data packets; and at each subscriber station, downloading into a memory storage device those of said received data packets which match said specified set of requested data packets;

wherein said generating step generates indices including timestamps therein, said timestamps indicating when each said portion of the information database referenced by an index is to be transmitted;

said method including decoding said timestamps in said indices at said subscriber stations;

whereby subscribers can be informed as to when a specified portion of the information database will be received.

40. The information transmission method of claim 39, wherein each timestamp includes a repetition rate value indicating how often the associated portion of the information database is transmitted, and a time skew value indicating in conjunction with said repetition rate value a transmission time for the associated portion of the information database.

41. The information transmission method of claim 40, scheduling transmission of selected portions of said information database, including assigning each selected portion of said information database one or more scheduled transmission times;

wherein the timestamp in indices referencing portions of the information database not scheduled for transmission is null, indicating that said referenced portions of the information database are transmitted only upon request by subscribers.

42. An information transmission method comprising the steps of:

storing an information database on one or more memory devices;

generating and storing on said memory devices a set of indices for referencing data in said information database, including distinct indices for referencing distinct portions thereof, and embedding said indices in said information database;

scheduling transmission of selected portions of said information database, including assigning each selected portion of said information database a transmission repetition rate and one or more scheduled transmission times in accordance with said assigned repetition rate;

transmitting a stream of data packets containing said selected portions of said information database in accordance with said scheduled transmission times;

receiving said transmitted stream of data packets at subscriber stations;

at each subscriber station, storing filter data corresponding to a subset of said indices, said filter data specifying a set of requested data packets which comprises a subset of said transmitted data packets; and at each subscriber station, downloading into a memory storage device those of said received data packets which match said specified set of requested data packets;

said transmitting step including transmitting said stream of data packets to one or more cable television systems that receive the transmitted stream of data packets and retransmit said stream of data packets via cables to a set of subscribers, and including in said stream of data packets special data packets indicating where in said stream of data packets local programming data packets may be inserted; and one or more of said cable television systems inserting into the stream of retransmitted data packets local programming data packets at positions in said stream of data packets indicated by said special data packets.

43. An information transmission method comprising the steps of:

storing an information database on one or more memory devices;

generating and storing on said memory devices a set of indices for referencing data in said information database, including distinct indices for referencing distinct portions thereof, and embedding said indices in said information database;

scheduling transmission of selected portions of said information database, including assigning each selected portion of said information database a transmission repetition rate and one or more scheduled transmission times in accordance with said assigned repetition rate;

transmitting a stream of data packets containing said selected portions of said information database in accordance with said scheduled transmission times;

receiving said transmitted stream of data packets at subscriber stations;

at each subscriber station, storing filter data corresponding to a subset of said indices, said filter data specifying a set of requested data packets which comprises a subset of said transmitted data packets; and at each subscriber station, downloading into a memory storage device those of said received data packets which match said specified set of requested data packets;

said transmitting step including transmitting said stream of data packets to one or more cable television systems that receive the transmitted stream of data packets and retransmit said stream of data packets via cables to a set of subscribers, and including in said stream of transmitted data packets special data packets designated as suitable for pre-emption by local programming; and one or more of said cable television systems inserting into the stream of retransmitted data packets additional "local programming" data packets so as to pre-empt said special data packets designated as suitable for pre-emption.

44. An information transmission method comprising the steps of:

storing an information database on one or more memory devices;

generating and storing on said memory devices a set of indices for referencing data in said information database, including distinct indices for referencing distinct portions thereof, and embedding said indices in said information database;

scheduling transmission of selected portions of said information database, including assigning each selected portion of said information database a transmission repetition rate and one or more scheduled transmission times in accordance with said assigned repetition rate;

transmitting a stream of data packets containing said selected portions of said information database in accordance with said scheduled transmission times;

receiving said transmitted stream of data packets at subscriber stations;

at each subscriber station, storing filter data corresponding to a subset of said indices, said filter data specifying a set of requested data packets which comprises a subset of said transmitted data packets; and at each subscriber station, downloading into a memory storage device those of said received data packets which match said specified set of requested data packets;

said transmitting step including assigning transmission times to said selected portions of said information database and reserving transmission times for transmitting portions of said information database requested by subscribers;

said method including receiving requests from subscribers, said request each specifying a portion of said information database; and said transmitting step including transmitting said requested portions of said information database during said reserved transmission times.

45. An information transmission method comprising the steps of:

storing an information database on one or more memory devices;

generating and storing on said memory devices a set of indices for referencing data in said information database, including distinct indices for referencing distinct portions thereof, and embedding said indices in said information database;

scheduling transmission of selected portions of said information database, including assigning each selected portion of said information database a transmission repetition rate and one or more scheduled transmission times in accordance with said assigned repetition rate;

transmitting a stream of data packets containing said selected portions of said information database in accordance with said scheduled transmission times;

receiving said transmitted stream of data packets at subscriber stations;

at each subscriber station, storing filter data corresponding to a subset of said indices, said filter data specifying a set of requested data packets which comprises a subset of said transmitted data packets; and at each subscriber station, downloading into a memory storage device those of said received data packets which match said specified set of requested data packets;

wherein one or more subsets of said subscriber stations are interconnected via a local area network including a network server;

said storing an information database step further including embedding in said information database cross-referencing indices for cross-referencing related information;

said method including receiving at said network server said transmitted stream of data packets on behalf of an associated set of subscriber stations, storing filter data in said network server referencing a set of requested data packets, said set of requested data packets representing a union of data packets requested by said associated set of subscriber stations, and downloading into a memory storage device associated with said network server those of said received data packets which match said set of requested data packets;

said network server further adding, in accordance with predefined criteria, data corresponding to ones of said cross-referencing indices embedded in said downloading data packets to said filter data stored by said network server so as to specify additional data packets to be downloaded;

whereby overhead associated with receiving the stream of data packets and downloading for storage a specified subset thereof is shared by a set of subscribers.

46. An information transmission system comprising:

a set of one or more computer memory devices on which is stored an information database;

database editing means, coupled to said one or more computer memory devices, for generating a set of indices for referencing data in said information database, including distinct indices for referencing distinct portions thereof, and for embedding said indices in said information database; said database editing means further embedding in said information database cross-referencing indices for cross-referencing related information;

a transmitter, coupled to said one or more computer memory devices, for transmitting a stream of data packets containing said selected portions of said information database;

subscriber stations that each receive said transmitted stream of data packets, each subscriber station including data filter that stores filter data, said filter data specifying a set of requested data packets which comprises a subset of said transmitted data packets, and that downloads into a memory storage device associated with said each subscriber station those of said received data packets which match said filter data stored by said each subscriber station;

said subscriber stations including a network server interconnected via a local area network to a set of network subscriber stations;

said network server including a receiver that receives said transmitted stream of data packets on behalf of said network subscriber stations; said filter data stored by said network server referencing a specified set of requested data packets, said specified set of requested data packets representing data packets requested by said network subscriber stations;

said network server including data processing apparatus that specifies additional data packets to be downloaded into said memory storage device associated with said network server by automatically adding to said filter data stored by said network server, in accordance with predefined criteria, data corresponding to ones of said cross-referencing indices embedded in said data packets downloaded by said network server;

whereby overhead associated with receiving the stream of data packets and downloading for storage a specified subset thereof is shared by a set of network subscriber stations.

47. An information transmission method comprising the steps of:

storing an information database on one or more memory devices;

generating and storing on said memory devices a set of indices for referencing data in said information database, including distinct indices for referencing distinct portions thereof, and embedding said indices in said information database; said storing step further including embedding in said information database cross-referencing indices for cross-referencing related information;

transmitting a stream of data packets containing selected portions of said information database;

receiving said transmitted stream of data packets at subscriber stations, said subscriber stations including a network server interconnected via a local area network to a set of network subscriber stations;

each subscriber station storing filter data corresponding to a subset of said indices, said filter data specifying a set of requested data packets which comprises a subset of said transmitted data packets;

each subscriber station downloading into a memory storage device associated with said each subscriber station those of said received data packets which match said filter data stored by said each subscriber station;

said receiving step including receiving at said network server said transmitted stream of data packets on behalf of said network subscriber stations; said filter data stored by said network server referencing a specified set of requested data packets, said specified set of requested data packets representing data packets requested by said network subscriber stations;

said network server specifying additional data packets to be downloaded into said memory storage device associated with said network server by automatically adding to said filter data stored by said network server, in accordance with predefined criteria, data corresponding to ones of said cross-referencing indices embedded in said data packets downloaded by said network server;

whereby overhead associated with receiving the stream of data packets and downloading for storage a specified subset thereof is shared by a set of network subscriber stations.

48. An information transmission system comprising:

a set of one or more computer memory devices on which is stored an information database;

database editing means, coupled to said one or more computer memory devices, for generating a set of indices for referencing data in said information database, including distinct indices for referencing distinct portions thereof, and for embedding said indices in said information database;

a transmitter, coupled to said one or more computer memory devices, for transmitting a stream of data packets containing said selected portions of said information database;

subscriber stations that each receive said transmitted stream of data packets, each subscriber station including a data filter that stores filter data, said filter data specifying a set of requested data packets which comprises a subset of said transmitted data packets, and that downloads into a memory storage device associated with said each subscriber station those of said received data packets which match said filter data stored by said each subscriber station;

said transmitter further transmitting in said stream of data packets special data packets indicating where in said stream of data packets local programming data packets may be inserted; and one or more of said cable television systems including means for inserting into the stream of retransmitted data packets local programming data packets at positions in said stream of data packets indicated by said special data packets.

* * * * *

(12) EX PARTE REEXAMINATION CERTIFICATE (7694th)
United States Patent
Levinson

(10) Number: US 5,404,505 C1
(45) Certificate Issued: Aug. 24, 2010

(54) SYSTEM FOR SCHEDULING TRANSMISSION OF INDEXED AND REQUESTED DATABASE TIERS ON DEMAND AT VARYING REPETITION RATES

(75) Inventor: Frank H. Levinson, Palo Alto, CA (US)

(73) Assignee: Finisar Corporation, Sunnyvale, CA (US)

Reexamination Request:
No. 90/008,282, Oct. 5, 2006
No. 90/008,408, Jan. 12, 2007
No. 90/008,807, Aug. 1, 2007
No. 90/009,318, Nov. 5, 2008

Reexamination Certificate for:
Patent No.: 5,404,505
Issued: Apr. 4, 1995
Appl. No.: 07/786,453
Filed: Nov. 1, 1991

(51) Int. Cl.
*H04H 1/00* (2006.01)
*H04H 1/02* (2006.01)
*H04H 1/10* (2006.01)
*H04B 7/185* (2006.01)
*H04N 7/173* (2006.01)

(52) U.S. Cl. ............. 370/468; 348/E7.069; 348/E7.093; 370/473; 707/999.01; 715/200; 725/105; 725/138; 725/140; 725/63

(58) Field of Classification Search ........................ None
See application file for complete search history.

(56) References Cited

U.S. PATENT DOCUMENTS 2,949,505 A 8/1960 Kretzmer
3,602,891 A 8/1971 Clark et al.

(Continued)

FOREIGN PATENT DOCUMENTS

EP 0 005 317 A1 11/1979
EP 0-472 521 3/1990
WO 90/01243 2/1990

OTHER PUBLICATIONS

Hallenbeck, Peter D., et al., "Personal Home TV Programming Guide", IEEE Int'l Conference on Consumer Electronics, Digest of Technical Papers, Jun. 6–8, 1990, pp. 310–311.

(Continued)

*Primary Examiner*—Majid A. Banankhah

(57) ABSTRACT

An information broadcasting system provides a large number of subscribers access to a large amount of information using one or more satellite transmission channels. The system can also use cable television transmission channels. A program supplier station stores an information database and tags all the information in the database with indices so as to form a single hierarchical structure which encompasses the entire information database. Portions of the information database are transmitted often, at least once per day, in order to provide the basic subscriber with information need to access the remainder of the database. The information provided by the basic subscriber service, which will typically include at least 50 gigabytes of data, is available to all subscribers without requiring two way communications between the subscribers and the program supplier station. Using a tiered system for a scheduling transmission of the 50 gigabytes or so of information included in the basic subscriber service, as well as an intelligent subscriber request anticipation scheme for retrieving information before the subscriber asks for it, the present invention provides subscribers with reasonably quick access to all the contents of the large database while using only a modest amount of bandwidth. Furthermore, by reserving a portion of the system's bandwidth for satisfying requests for access to information not provided with the basic subscriber service, timely access to a virtually unlimited amount of information can be provided, using the same modest transmission bandwidth, to those subscribers willing to pay additional fees for that service.

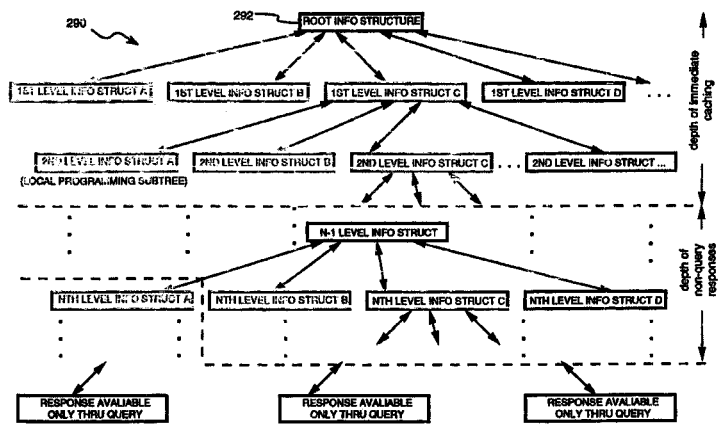

U.S. PATENT DOCUMENTS

| | | | |
|---|---|---|---|
| 3,927,250 A | 12/1975 | Rainger | |
| 4,054,911 A | 10/1977 | Fletcher et al. | |
| 4,104,486 A | 8/1978 | Martin et al. | |
| 4,126,762 A | 11/1978 | Martin et al. | |
| 4,163,254 A | 7/1979 | Block et al. | |
| 4,204,093 A | 5/1980 | Yeh | |
| 4,215,369 A | 7/1980 | Iijims | |
| 4,225,884 A | 9/1980 | Block et al. | |
| 4,233,628 A | 11/1980 | Ciciora | 358/147 |
| 4,277,838 A | 7/1981 | Chambers | |
| 4,302,628 A | 11/1981 | Akrich et al. | |
| 4,308,558 A | 12/1981 | Hernandez et al. | |
| 4,337,485 A | 6/1982 | Chambers | |
| 4,343,042 A | 8/1982 | Schrock et al. | |
| 4,361,848 A | 11/1982 | Poignet et al. | |
| 4,381,522 A | 4/1983 | Lambert | |
| 4,429,385 A | 1/1984 | Cichelli et al. | |
| 4,450,477 A | 5/1984 | Lovett | |
| 4,454,538 A | 6/1984 | Toriumi | |
| 4,484,217 A | 11/1984 | Block et al. | |
| 4,506,387 A | 3/1985 | Walter | |
| 4,528,589 A | 7/1985 | Block et al. | |
| 4,533,936 A | 8/1985 | Tiemann et al. | |
| 4,536,791 A | 8/1985 | Campbell et al. | |
| 4,573,072 A | 2/1986 | Freeman | |
| 4,602,279 A | 7/1986 | Freeman | |
| 4,614,972 A | 9/1986 | Motsch et al. | 358/147 |
| 4,677,686 A | 6/1987 | Husting et al. | |
| 4,694,490 A | 9/1987 | Harvey et al. | |
| 4,697,046 A | 9/1987 | Geerings et al. | 178/1 |
| 4,704,725 A | 11/1987 | Harvey et al. | |
| 4,706,121 A | 11/1987 | Young | |
| 4,716,410 A | 12/1987 | Nozaki | |
| 4,720,873 A | 1/1988 | Goodman et al. | |
| 4,734,765 A | 3/1988 | Okada et al. | |
| 4,737,953 A | 4/1988 | Koch et al. | 370/94 |
| 4,739,510 A | 4/1988 | Jeffers et al. | |
| 4,751,578 A | 6/1988 | Reiter et al. | |
| 4,763,322 A | 8/1988 | Eizenhofer | |
| 4,768,144 A | 8/1988 | Winter et al. | |
| 4,821,261 A | 4/1989 | Pommier | |
| 4,845,658 A | 7/1989 | Gifford | |
| 4,862,268 A | 8/1989 | Campbell et al. | |
| 4,866,770 A | 9/1989 | Seth-Smith et al. | |
| 4,868,866 A | 9/1989 | Williams, Jr. | |
| 4,897,782 A | 1/1990 | Bennett et al. | |
| 4,908,707 A | 3/1990 | Kinghorn | |
| 4,908,859 A | 3/1990 | Bennett et al. | |
| 4,931,870 A | 6/1990 | den Hollander | 358/142 |
| 4,937,821 A | 6/1990 | Boulton | |
| 4,956,772 A | 9/1990 | Neches | |
| 4,965,825 A | 10/1990 | Harvey et al. | |
| 4,977,455 A | 12/1990 | Young | |
| 4,994,926 A | 2/1991 | Gordon et al. | |
| 5,038,211 A | 8/1991 | Hallenbeck | |
| 5,040,175 A | 8/1991 | Tuch et al. | |
| 5,045,848 A | 9/1991 | Fascenda | |
| 5,068,724 A | 11/1991 | Krause et al. | |
| 5,089,885 A | 2/1992 | Clark | |
| 5,091,782 A | 2/1992 | Krause et al. | |
| 5,093,718 A | 3/1992 | Hoarty et al. | |
| 5,109,414 A | 4/1992 | Harvey et al. | |
| 5,132,992 A | 7/1992 | Yurt et al. | |
| 5,164,938 A | 11/1992 | Jurkevich et al. | |
| 5,172,413 A | 12/1992 | Bradley et al. | |
| 5,193,189 A | 3/1993 | Flood et al. | |
| 5,220,420 A | 6/1993 | Hoarty et al. | |
| 5,220,501 A | 6/1993 | Lawlor et al. | |
| 5,230,073 A | 7/1993 | Gausmann et al. | |
| 5,241,305 A | 8/1993 | Fascenda et al. | |
| 5,247,575 A | 9/1993 | Sprague et al. | |
| 5,260,778 A | 11/1993 | Kauffman et al. | |
| 5,283,639 A | 2/1994 | Esch et al. | |
| 5,285,272 A | 2/1994 | Bradley et al. | |
| 5,293,357 A | 3/1994 | Hallenbeck | |
| 5,321,750 A | 6/1994 | Nadan | |
| 5,940,148 A | 8/1999 | Joseph et al. | |
| 6,658,661 B1 | 12/2003 | Arsenault et al. | |

OTHER PUBLICATIONS

PBS to Transmit Auto VCR Programmer, Television Digest vol. 30, No. 30, Jul. 23, 1990, pp. 13–14.

Aukstikalnis, Anthony J., "The Interactive Evolution", 1987 NCTA Technical Papers, pp. 246–250.

Baran, Paul, "Packetcable: A New Interactive Cable System Technology", 1982 NCTA Technical Papers, pp. 1–6.

Brown, Larry, "Addressable Control—A Big First Step Toward The Marriage of Computer, Cable, and Consumer", 1981 NCTA, pp. 44–46.

Brugliera, Vito et al., "Security Considerations for Impulse Pay–per–View Systems", 1987 NCTA Technical Papers, pp. 154–159.

Bufler, Andrew, et al., "A Trial of A National Pay–Per–View Ordering and Billing System", 1986 NCTA Technical Papers, pp. 134–139.

Ciciora, Walter, "Virtext & Virdata: Adventures In Vertical Interview Signaling", 1981 NCTA Technical Papers, pp. 101–104.

Ciciora, Walter et al., "Videotex Alternatives in Cable", 1983 NCTA Technical Papers, pp. 166–172.

Clark, Dennis R., "Store and Forward IPPV Via the Telephone Return Path", 1986 NCTA Technical Papers, pp. 115–120.

Corbett, Jefferson et al., "ANI as a PPV Ordering Tool", 1988 NCTA Technical Papers, pp. 1–3.

Dickinson, Robert V. C., "Carriage of Multiple One–Way and Interactive Service on CATV Networks" 1982 NCTA Technical Papers, pp. 16–21.

Eissler, Charles O., "Addressable Control", 1981 NCTA Technical Papers, pp. 29–33.

Eissler, Charles O., "Addressable Control for the Small System", 1982 NCTA Technical Papers, pp. 32–36.

Farmer, James O., "Operational Characteristics of Modern Set–Top Terminals", 1984 NCTA Technical Papers, pp. 223–234.

Goldbert, Efrem I., Videotex on Two–Way Cable Television Systems—Some Technical Considerations, 1982 NCTA Technical Papers, pp. 166–174.

Hideshima, Yashiro, "Digital Audio and Data Transmission System for CATV Line", 1984 NCTA Technical Papers, pp. 90–94.

Hospador, Andrew E., "Control of Remote Hubs in Addressable CATV Systems", 1985 NCTA Technical Papers, pp. 40–46.

Long, Michael E. et al., "An Enhanced RF Television Scrambling System Using Phase Modulation", 1987 NCTA Technical Papers, pp. 140–147.

McGinty, Emory, "Using Narrow Band Data Transmission as an Information Delivery System for CATV Application", 1986 NCTA Technical Papers, pp. 47–52.

Neville, Thomas et al., "The Application of National ANI to Pay–Per–View Ordering", 1988 NCTA Technical Papers, pp. 11–13.

O'Brien, Thomas E. Jr., "A Unified Approach to Data Transmission Over CATV Networks", 1981 NCTA Technical Papers, pp. 119–123.

Pidgeon, Rezin E., et al., "Frequency Allocation for Data and Video", 1983 NCTA Technical Papers, pp. 64–68.

Schoeneberger Carl F., "Addressable Terminal Control Using the Vertical Interval", 1981 NCTA Technical Papers, pp. 34–40.

Shane, Leo J., "Application of Data on Cable Systems", 1984 NCTA Technical Papers, pp. 148–155.

Stratton, Franc, "Broadband Packet–Switching", 1985 NCTA Technical Papers, pp. 304–307.

Thomas, William L., "Full Field Tiered Addressable Teletext", 1982 NCTA Technical Papers, pp. 44–46.

Wechselberger, Anthony J., "Encryption–Based Security Systems, What Makes Them Different and How Well are They Working?", 1987 NCTA Technical Papers, pp. 148–153.

Woodcock, David A., "Launching a Statewide ANI Passing Impulse PPV System", 1988 NCTA Technical Papers, pp. 4–10.

Anderson et al, "Support for Continuous Media in the Dash System", May 28–Jun. 1, 1990, IEEE Computer Society Press, pp. 54–61.

Berra et al, "Architecture For Distributed Multimedia Database Systems", vol. 13 No. 4 May 1990, pp. 217–231.

Biggs et al., "Broadcast Data In Television", GEC Journal of Science & Technology, vol. 41, No. 4, 1974, pp. 117–124.

Broadcast Teletext Specification dated Sep. 1976, BBC, pp. 1–20.

Castell, "Nationwide Information Services Using Data Broadcasting", Dec. 1987, pp. 391–397.

J.R. Chew, "Ceefax: Evolution and Potential", BBC, Aug. 1977, pp. 1–15.

Pim, D.M., "The Institution of Electronic and Radio Engineers Conference on Electronic Delivery of Data and Software", The Cavendish Conference Center London, Sep. 16–17, 1986, pp. 1–144.

Ellis et al., "INDAX: An Operational Interactive Cabletext System" IEEE Journal on Selected areas in Communications, vol. Sac–1, No. 2, Feb. 1983, pp. 285–294.

Garr et al, "Data Broadcasting in the USA Low Cost Delivery Alternative and More", IEEE Transactions of Consumer Electronics, Oct. 17, 1990, pp. 877–884.

Gecsei, "The Architecture of Videotex Systems", 1983, Prentice Hall, Inglewood Cliffs, New Jersey, pp. 1–276.

Gifford et al., "An Architecture for Large Scale Information Systems", 1985, pp. 161–169.

Gifford, "Polychannel Systems for Mass Digital Communication", Communications of the ACM, Feb. 1990, vol. 33, No. 2, pp. 141–151.

Gifford et al., "The Application of Digital Broadcast Communication to Large Scale Information Systems", IEEE Journal On Selected Areas In Communications, vol. SAC–3, No. 3, May 1985, pp. 457–467.

"LSI Circuits for Teletext and Viewdata"—The Lucy Generation, (no date given), pp. 1–80.

McKee, "Data Television—A Bright Star On The Color TV Horizon" Feb. 1, 1979, pp. 55–63.

Mothersole, et al., "Broadcast Data Systems Teletext and RDS", Published by Butterworth & Co. (Publishers) Ltd, 1990, pp. 1–148.

CBS/CCETT "North American Broadcast Teletext Specification", Jun. 22, 1981, pp. 24–240.

Pim, "Telesoftware Via Full Channel Teletext", (no date given), pp. 49–54.

Ref. 10–"World System Teletext and Data Broadcasting System" Technical Specification , Jan. 1989, pp. DTV–PA 000519–759.

Robinson et al., "Touch–Tone Teletex—A Combined Teletext–ViewData System" IEEE Transactions on Consumer Electronics, vol. CE–25, No. 3, Decoy Network Technology With Automatic Signature Generation for Intrusion Detection and Intrusion Prevention Systems, Jul. 1979, pp. 297–303.

Tanton, "UK Teletext–Evolution and Potential" BBC Research Department, IEEE Transactions on Consumer Electronics, vol. CE–25, No. 3, Jul. 1979, pp. 246–250.

Veith, R., "Television's Teletex", Elsevier Science Publishing Co., Inc., 1983, pp. 1–180.

Bown, H.G et al., "Telidon Technology Developments", Videotex '81 International Conference & Exhibition May 20–22, 1981—Toronto, Canada, pp. i–xxxiv & 1–470.

Campbell et al., "Dig–Music on Demand Digital Musical Selection System Utilizing CATV Facilities", IEEE Transactions on Consumer Electronics, Sep. 1982, pp. 8 total.

Chambers, J.P., "Enhanced UK Teletext Moves Towards Still Pictures", 1980 IEEE Chicago Spring Conference, Part 1, pp. 527–554.

Scientific–Atlanta Services, Features and Functions Annex 6 by Satellite Television Corporation, Nov. 8, 1984, pp. 1–624.

ViewData and VideoText, 1980–81: A Worldwide Report Transcript of Viewdata '80 first world conference on viewdata, videotex, and teletext, pp. 1–623.

Press Release titled Good is going for Coral on Datacast date Apr. 23, 1987, 1 page.

Crowther G. O., TeleText and ViewData Systems and Their Possible Extension to Europe and Asia by G. O.1979 IEEE Chicago Spring Conference, pp. 288–294.

G. A. McKenzie, "Oracle—An Information Broadcasting Service Using Data Transmission in the Vertical Interva", Jan. 1974 Journal of the SMPTE, pp. 6–10.

Diermann, L, "11th International Television Symposium" May 27–Jun. 1, 1979, pp. 1–8.

Kaneko, "Digital Transmission of Broadcast Television with Reduced Bit Rate", NTC'77 Conference Record vol. 3, 1977, pp. 1–7.

Didler Le Gall, "MPEG: A Video Compression Standard for Multimedia Applications" Publications of the ACM Apr. 1991, pp. 47–58.

International Telecommunication Union Recommendations of the CCIR, 1990 vol. XI–Part 1, 500 pages.

Joseph Roizen, "Teletext in the USA", SMPTE Journal, Jul. 1981, pp. 602–610.

A. James, "Oracle–Broadcasting the Written Word", Wireless World, Jul. 1973, pp. 1–3.

"BBC Datacast—A New Generation Of Data Transmission Networks Using Broadcast Video Channels", (no date given) pp. 1–12.

Lawson Brown, "BBC Datacast—A New Generation Of Data Transmission Networks Using Broadcast Video Channels", Oct. 1985, pp. 111–122.

Sigel, "The Future of Videotext—Worldwide Prospects for Home/Office Electronic Information Service" 1983, pp. 1–197.

Mothersole, "Teletext and Viewdata: New Information Systems Using The Domestic Television Recovery", Proc. IEEE, vol. 126, No. 12, Dec. 1979, pp. 1350–1354.

Chapter 10–13 Databases for Videotex, (no date given), pp. 174–177.
Gifford, "Polychannel Systems for Mass Digital Communication", Communications of the ACM, vol. 33, No. 2, Feb. 1990, pp. 141–161.
Herman, "The Datacycle Architecture for Very High Throughput Database Systems", ACM 0–89791–236–5/87/ 0005/0097, 1987 pp. 97, 99, 101 & 103.
Townsend, "Broadcast Data" British Library—"The World's Knowledge", Sep. 1988, pp. 36, 38 & 40.
"Transnational Data Report" re Cable and Wireless Global Digital Highway, Feb. 24, 1987, pp. 2 total.
Richard Woods, "Article in the Sunday Times, titled—Follow Shares on TV", Nov. 1, 1987, pp. 1.
News article dated Sep. 1988 supplied by the British Library—"The World's knowledge" titled—Halifax to use BBC's Datacast service, Sep. 1988, pp. 2 total.
Levi et al., "The Prevention of Cheque and Credit Card Fraud", Jun. 1991, pp. ii–vi and 1–51.
Section 1 Technology , Mar. 14, 1991—The Financial Times Limited, pp. 1–2.
"Computer Guardian Broadcast Programs—Video Backup That Sends Data Fast From A Satellite", Aug. 18, 1988, pp. 3–4.
Chorafas , "Interactive Videotex—The Domesticated Computer", Jan. 1981, pp. 1–263.
Molina et al. "An Implementation Of Reliable Broadcast Using An Unreliable Multicast Facility" 1988 IEEE, pp. 101–112.
Yamakawa et al., "The study for an Advanced Use of Satellite Communication ; The development of the Distributed Videotex DataBase Retrieval System Using Satellite Communication", Fujitsu Limited, Jan. 18–21, 1987, pp. 346–355.
Anderson et al., "Support for Continuous Media in the Dash System", Computer Science Division, The 10th Int'l Conf. on Distributed Computing Systems Paris, France, May 28–Jun. 1, 1990 IEEE Computer Society Press, pp. 54–61.
Tseung et al., "Guaranteed, Reliable, Secure Broadcast Networks", Phoenix Conference on Computers and Communications, IEEE Computer Society Press, Conference Proceedings Mar. 21–23, 1990, pp. 576–581.
Bradley, "Project Glass Testing Networked Video Tape Rentals", Digital Technology Spanning the Universe, IEEE Communications Society, Philadelphia, PA, Jun. 12–15, 1988, pp. 881–882.
Hurley et al., "The Videotex and Teletext Handbook—Home and Office Communications Using Microcomputers and Terminals", 1995, pp. 1–404.
Lipinski et al., "Market Potential, Technology, Public Policy Issue", McGraw–Hill, Inc. 1982, pp. 1–315.
"A New Generation Of Data Transmission Networks Using Broadcast Video Channels", BBC Datacast—Enterprises Ltd. 1986, pp. 1–10.
"Datacast Gains Major Users" Article in Information World Review Newspaper, Nov. 1986, pp. 4 total.
Charlish, "Coral Bets on BBC's Wavelength", Financial Times, May 7, 1987, pp. 1.
Armytage, Stock Market Pilot Puts Prices On Air Computer Weekly, Nov. 6, 1986, pp. 1.
Cane, "Big Bang more of a continuous rumble", Feb. 24, 1987 in the Financial Times, pp. 1.
Share Price Broadcasts To Beat Phone Strike, New Scientist, Feb. 5, 1987, pp. 1.
Electronic Publishing BBC spread Datacast in the Insurance Systems Bulletin dated Jan. 1987, pp. 1.
Castell, "Nationwide Value Added and Data Services Using Data Broadcasting", (no date given), pp. 63, 65, 67 & 69.
Castell, Update of a cd–rom using BBC Datacast to Provide a Nationwide Real–Time Information Service: The ECCTIS Educational Pilot, BBC Datacast, UK, Oct. 1987, pp. 101–110.
Nakagawa et al. "Article titled—PCM Video Recording Using a Rotating Magnetic Sheet" 11th International Television Symposium Montreux (Switzerland) May 27–Jun. 1, 1979 Symposium Record, pp. 1–8.
Nasse, "625–Line Component Recording, BIT Rate Reduction and Error Protection"11th International Television Symposium Montreux (Switzerland) May 27–Jun. 1, 1979 Symposium Record, pp. 1–10.
Breeze, "Television Line 21 Encoded Information and its Impact on Receiver Design", Received Aug. 28, 1972, pp. 234–237.
Baer, "Tele–Brief Novel User–Selectable Real Time News Headline Service for Cable TV", Sanders Associates, Inc., IEEE, vol. CE–25, No. 3, Jul. 1979, pp. 406–408.
Crowther, Dynamically Redefinable Character Sets Mullard Limited in 1990 IEEE Transactions on Computer Electronics, vol. CE–26, Nov. 1980 Chicago Spring Conference, pp. 707–717.
Fischer, "What is the impact of Digital TV?" ITT Semiconductors—IEEE 1982, pp. 423–430.
Lucas, "625–Line PCM Composite PAL Signal Recording and Error Concealment", 11th International Television Symposium Montreux (Switzerland) May 27–Jun. 1, 1979 Symposium Record, pp. 1–14.
Cable '84 by Walter S. Ciciora, American Television & Comm. (1) Arlen "Thanks to the Memories: Teledelivery, Downloading and their roles in Cable TV", pp. 52–55 (2) Rayman et al. "The Brighter Side of Television Delivery of Information in the VBI", pp. 159–167, (3) Dickinson, "Cable or Home Power for Off–Premises Addressables", pp. 164–167.
Crowther ,"Adaptation of U.K. Teletext System for 525/60 Operation", Mullard Limited—IEEE 1980, pp. 587–596.
Ciciora et al, An Introduction to Teletext Viewdata With Comments On Compatibility Zenith Radio Corporation—IEEE Transactions on Consumer Electronics Jul. 1979, pp. 235–245.
Gicca, "Digital Spacecraft TV Can Beat Bit–Rate And Weight Problems", Dec. 1962, Raytheon Co., pp. 73–78.
Digital Video—Selections from the SMPTE Journal and Other Publications published in Mar. 1977, Society of Motion Picture and Television Engineers, pp. 1–113.
Cominetti, "Teletext Transmission Problems and Field–Trials Results" 11th International Television Symposium Montreux (Switzerland) May 27–Jun. 1, 1979 Symposium Record, pp. 1–12.
Steele, "An Experimental Digital Video Recorder Based on a One–Inch Type "C" Format Machine—A progress Report", Sony Broadcast Limited in 11th International Television Symposium Montreux (Switzerland) May 27–Jun. 1, 1979 Symposium Record, pp. 1–8.
Gibson , "Sample Rate Standardization for Digital Audio Recording," RCA Laboratories in 11th International Television Symposium Montreux (Switzerland) May 27–Jun. 1, 1979 Symposium Record, pp. 1–2.

Marti, The Concept of a Universal "Teletext" (Broadcast and Interactive Videotex) decoder, microprocessor based, CCETT Rennes, France in 11th International Television Symposium Montreux (Switzerland) May 27–Jun. 1, 1979 Symposium Record, pp. 30 total.

Ming Liou, "Overview of the px64 kbits/s Video Coding Standard", Communications of the AGM, Apr. 1991/vol. 34, No. 4, pp. 61–63.

Motoki et al., "Present Status of Three–Dimensional Television Research", Proceedings of the IEEE, vol. 83, No. 7, Jul. 1995, pp. 1009–1054.

Goodall, "Television by Pulse Code Modulation" in The Bell System Technical Journal—Jan. 1951, pp. 33–49.

Bradley, "Data Compression for Image Storage and Transmission" presented at the Idea Symposium—May 1970, vol. 11/4 Fourth.Quarter, pp. 147–150.

International Organization for Standardization—MPEG Video Committe Draft dated Dec. 18, 1990, pp. 1–56.

Pennebaker "JPEG Still Image Data Compression Standard", Copyright 1993, by Van Nostrand Reinhold, pp. 335–625.

"Draft Revision of Recommendation H–261: Video Codec for Audiovisual services at px64kbits/s", Elsevier Science Publishers B.V., Mar. 1990, pp. 221–239.

"Line transmission of Non–Telephone Signals", Video Codec for Audiovisual services at px64kbits/s—ITU–T Recommendation H.261, Mar. 1993, pp. 1–25.

Baumunk et al., "Pictorial Data transmission from a Space Vehicle" Electrical Engineering, Feb. 1960, pp. 134–138.

Carbrey, "Video Transmission Over Telephone Cable Pairs by Pulse Code Modulation" published in the Sep. 1960 monthly by the Institute of Radio Engineers, Inc., pp. 1546–1561.

"Encoding Parameters of Digital Television for Studios", Recommendations of the CCIR, 1990 vol. XI—Part 1 Broadcasting Service (Television)—Geneva 1990, pp. 95–104.

BBC Engineering including Engineering Division Monopraphs, No. 108, Dec. 1977, pp. 1–2.

Chambers, "Teletex—The Potential of an Extended System", International Broadcasting Convention, Metropole Conference and Exhibition Centre, Sep. 20–23, 1980, pp. 114–117.

Chambers, "Teletext alphabets and error protection", No. 173, Feb. 1979, pp. 25–29.

Chambers, "The Use of Coding Techniques to Reduce the Tape Consumption of Digital Television Recording" Proceedings of the Conference on Video and Data Recording, Jul. 10–12, 1973, pp. 71–74.

Shanmugam, "Digital and Analog Communication Systems" Time–Division Multiplexing, 1979, pp. 551–565.

Stafford, B. H., "Digital Television—Bandwidth Reduction and Communication Aspect", Aug. 1980, A Wiley–Interscience Publication, pp. 1–387.

Wallace, "The JPEG Still Picture Compression Standard", Communications of the ACM, vol. 34, No. 4, Apr. 1991, pp. 31–44.

Whelan, et al., "Digital TV Bandwidth Reduction Techniques as applied to Spacecraft Television", Volume of Technical Papers presented at AIAA Publication CP–12, Unmanned Spacecraft Meeting, Mar. 1–4, 1965, pp. 5–22.

Knight, et al., "Digital Television: Shrinking Bulky Bandwidths, Electronics", Dec. 14, 1964, pp. 77–84.

"Digital television" Article from the internet printed on Aug. 22, 2005, pp. 2.

"The History of Digital Television", Article from the internet, printed on Aug. 22, 2005, pp. 1–12.

H. Ohnsorge, "A Data Compression System for the Transmission of Digitalized Video Signals" IEEE Communications Society and the Seattle Section of IEEE, CAT. No. 73 CHO 744–3–CSCB, Jun. 11–13, 1973, pp. 48–5–48–11.

J. L. Riley "Enhanced UK Teletext: Experimental Equipment for High–Quality Picture coding and other Enhancements", BBC RD, Jul. 1983, 1–14.

Sandbank, C. P., "Digital Television", John Wiley & Sons, 1990, pp. 1–330.

Schreiber, "Fundamentals of Electronic Imaging Systems"–Some Aspects of Image Processing,, Springer–Verlag Berlin Heidelberg New York, London, Paris, Tokyo, Mar. 1986, pp. 1–187.

Le Counteur G.V., CEEFAX: Interference with Television From Data Signals Transmitted in the Field–Blanking Period, BBC Engineering, Mar. 1978, pp. 1–167, Ceefax Alphabets, Appendix I, Appendix II, Broadcast Teletext Specification, pp. 1–20.

Klingler R.J., Main Characteristics of the Different Broadcast Teletext Systems, 11th International Television Symposium Montreux (Switzerland) May 27–Jun. 1, 1979 Symposium Record, pp. 1–12.

Tyson, L., "A Tutorial On Recordable Compact Disc", 1991 Proceedings, 45th Annual Broadcast Engineering Conference Proceedings, Las Vegas, Nevada, NAB Broadcasters, pp. 1–497.

Steele H.F., "IBA Technical Review—Digital Television", pp. 1–3, Jun. 1973, Hawker P., An Introduction to Integrated Circuits and Digital Electronics, pp. 5–13, Baldwin et al., A Standards Converter Using Digital Techniques, pp. 15–29, "DICE—Digital Intercontinental Conversion Equipment", pp. 31–35, Hutt P.R., A System of Data Transmission in the Field Blanking Period of the Television Signal, pp. 37–44, Baldwin J. L. E., The Digital Future of Television Studio Centres, pp. 45–51, Wise F.H., The Application of Digital Techniques to Radio Frequency Circuits, pp. 53–59, "Oracle—Broadcasting the Written Word", pp. 61–64.

Witham, A.L. et al., "20 Developments in Teletext", May 1983, IBA Technical Review, pp. 1–26; Johnson G.A. et al., "The Networking of Oracle", pp. 27–42; Staff at the Mullard Application Laboratory, "Integrated Circuits for Receivers", pp. 43–56; Lamborne A.D., "NEWFOR—An Advanced Subtitle Preparation System", pp. 57–68.

S. Money, "Teletext and Viewdata" (1979), pp. 98–101.

SAA5243 Data Sheet, "Enhanced Computer Controlled Teletext Circuits (ECCT)", (Mar. 1991), pp. 583–616.

Ammar, M.H.et al., "The Design of Teletext Broadcast Cycles," Performance Evaluation 5, Elsevier Science Publishers B.V. (1985), pp. 235–242.

Ammar, M.H., "Teletex–Like Information Delivery Using Broadcast Polling," Computer Networks and ISDN Systems 12, Elsevier Science Publishers B.V. (1987), pp. 107–115.

Ammar, M.H., et al., "On the Optimality of Cyclic Transmission in Teletext Systems," IEEE Transactions on Communications, vol. Com–35, No. 1, Jan. 1987, pp. 68–73.

Anderson, D., et al., "Support for Continuous Media in the Dash System," Computer Science Division, The 10th Int'l Conf. on Distributed Computing Systems Paris, France, May 28–Jun. 1, 1990 IEEE Computer Society Press, pp. 54–61.

Andrews, B., "Data Broadcast in Stolen Card Chase," The Financial Times Limited, Mar. 14, 1991, pp. 1–2.

"Appeal Brief for Cross–Appellant Finisar Corporation (Nonconfidential Version," Appeal Nos. 07–1023, 07–1024, Jun. 11, 2007, pp. i–xi, 1–89.

Aukstikalnis, A.J., "The Interactive Evolution," Cable '87, 1987 NCTA Technical Papers, pp. 246–250.

"Automated Problem–Oriented Medical Information System (PROMIS) Functional Specification of a PROMIS Instance System," Dec. 1978, pp. 2–5.

"Automated Problem–Oriented Medical Information System (PROMIS) Functional Specification of a PROMIS Instance System," The PROMIS Display Medium, Data Structures and Medical Actions Enabled, NTIS, Dec. 1978, pp. 10–57.

"Automated Problem–Oriented Medical Information System (PROMIS) Functional Specification of a PROMIS Instance System," The PROMIS Medical Data Base Language, NTIS, Dec. 1978, pp. 73–122.

"Automated Problem–Oriented Medical Information System (PROMIS) Functional Specification of a PROMIS Instance System," The PROMIS Programming Language Manual, NTIS Nov. 1978, pp. 142–260.

"Automated Problem–Oriented Medical Information System (PROMIS) Functional Specification of a PROMIS Instance System," The PROMIS Node Management System, NTIS, Dec. 1976, pp. 313–376.

Baran, P., "Packetcable: A New Interactive Cable System Technology," 1982 NCTA Technical Papers, pp. 1–6.

Barros, P., et al., "Time Teletext—Present and Future, "NCTA Cable 1982 32nd Annual Convention, Las Vegas (May 1982), pp. 160–165.

Bensch, U., "VPV–Video Text Programs Videorecorder," IEEE Transactions on Consumer Electronics, vol. 34, No. 3, Aug. 1988, pp. 788–792.

Berra, P.B., et al., "Architecture For Distributed Multimedia Database Systems," vol. 13 No. 4 May 1990, pp. 217–231.

Biggs, A.J., et al., "Broadcast Data In Television," GEC Journal of Science & Technology, vol. 41, No. 4, 1974, pp. 117–124.

Braden, R., "Requirements for Internet Hosts–Application and Support," RFC 1123, Oct. 1989, pp. 1–98.

Broadcast Teletext Specification, Sep. 1976, BBC, pp. 1–20.

"Broadcast Information Systems," A Summary of the Accomplishments of the Washington University Computer Labs, 1967–1983, Published 1989, pp. 39–41.

Brown, L.C., "Addressable Control—A Big First Step Toward The Marriage of Computer, Cable, and Consumer," 1981 NCTA, pp. 42–46.

Brown, L., "BBC Datacast: A New Generation of Data Transmission Networks Using Television Broadcast Technology," pp. 111–122.

Brugliera, V., et al., "Security Considerations for Impulse Pay–per–View Systems," 1987 NCTA Technical Papers, pp. 154–159.

Bulfer, A.F., et al., "A Trial of a National Pay–Per–View Ordering and Billing System," Cable '86, Mar. 15–18, 1986, NCTA Technical Papers, pp. 134–139.

Castell, S., "Nationwide Information Services Using Data Broadcasting," Dec. 1987, pp. 391–397.

Ciciora, W. S., "Virtext & Virdata: Adventures In Vertical Interval Signaling," 1981 NCTA Technical Papers, pp. 101–104.

Ciciora, W. S., et al., "Videotex Alternatives in Cable," 1983 NCTA Technical Papers, pp. 166–172.

Clark, D.R., "Store and Forward IPPV Via the Telephone Return Path," 1986 NCTA Technical Papers, pp. 115–120.

Cogan, M.S., et al., Mitre Technical Report: PROMIS Communications–Design Description, MTR 2907 1, Sep. 1974, pp. 1–39.

Corbett, J., et al., "ANI as a PPV Ordering Tool," 1988 NCTA Technical Papers, pp. 1–3.

Dennis, T., "Computer Guardian Broadcast Programs–Videotape Backup the Sends Data Fast from a Statelite," Aug. 18, 1988, 2 total pages.

Dickinson, R.V.C., "Carriage of Multiple One–Way and Interactive Service on CATV Networks," 1982 NCTA Technical Papers, pp. 16–21.

Eissler, C.O., "Addressable Control," 1981 NCTA Technical Papers, pp. 29–33.

Eissler, C.O., "Addressable Control for the Small System," 1982 NCTA Technical Papers, pp. 32–36.

Ellis, et al., "INDAX: An Operational Interactive Cabletext System," IEEE Journal on Selected areas in Communications, vol. Sac–1, No. 2, Feb. 1983, pp. 285–294.

"Expert Report of Dr. Walter S. Ciciora in Reply to Reports of Dr. Randy Katz and Mr. John Hedger," pp. 1–10, Proof of Service p. 1, Nov. 9, 2007.

"Expert Report of Dr. Walter S. Ciciora re Invalidity of U.S. Patent No. 5,404,505," pp. 1–34, Index of Exhibits p. 1, Proof of Service p. 1, Exhibits 1–30, total p. 184, Oct. 19, 2007.

Farmer, J.O., "Operational Characteristics of Modern Set–Top Terminals," 1984 NCTA Technical Papers, pp. 223–234.

Gecsei, J., "Report in Comcast Cable Communications, *LLC v. Finisar Corp*. patent litigation," pp. 1–12, Proof of Service pp. 1, Invalidity Chart, pp. 1–8, Oct. 19, 2007.

Goldberg, E.I., "Videotex on Two–Way Cable Television Systems—Some Technical Considerations," 1982 NCTA Technical Papers, pp. 166–174.

Hallenbeck, P.D., et al., "Personal Home TV Programming Guide," IEEE Int'l Conference on Consumer Electronics, Digest of Technical Papers, Jun. 6–8, 1990, pp. 310–311.

Hendren, .J., Staff, "New VCR Will Put Couch Potatoes In Heaven," Times Tribune, Business, Sep. 21, 1990, pp. 1–2.

Hertzberg, R. Y. et al., "The PROMIS Network," Computer Networks vol. 4, No. 5, Oct./Nov. 1980, pp. 215–228.

Hideshima, Y., et al., "Digital Audio and Data Transmission System for CATV Line," 1984 NCTA Technical Papers, pp. 90–94.

Horton, M., Standard for Interchange of USENET Messages, RFC 850, Jun. 1983, pp. 1–18.

Hospador, A.E., "Control of Remote Hubs in Addressable CATV Systems," 1985 NCTA Technical Papers, pp. 40–46.

Howell, D.A., "A Primer on Digital Television," Digital Video, 1977(article originally published Jul. 1975), pp. 1–4.

Kantor, B., et al., "Network News Transfer Protocol A Proposed Standard for the Stream–Based Transmission of News," RFC 977, Feb. 1986, pp. 1–27.

Lottor, M., Domain Administrators Operations Guide, RFC 1033, Nov. 1987, pp. 1–22.

Messerschmid, U., "Teletext in the Federal Republic of Germany," Viewdata and Videotext, 1980–1981 A World Wide Report, Knowledge Industry Publications, Inc., pp. 431–445.

Mockapetris, P., "Domain Names–Concepts and Facilities," RFC 1034, Nov. 1987, pp. 1–55.

Mockapetris, P., "Domain Names–Implementation and Specification," RFC 1035, Nov. 1987, pp. 1–55.

Mockapetris, P., "DNS Encoding of Network Names and Other Types," RCF 1101, Apr. 1989, pp. 1–14.

Postel, J., "Simple Mail Transfer Protocol," RFC 821, Aug. 1983, pp. 1–68.

Postel, J. et al., Domain Requirements, RFC 920, Oct. 1984, pp. 1–14.

Postel, J., Domain Name System Implementation Schedule, Revised, RFC 921, Oct. 1984, pp. 1–13.

Postel, J. et al., File Transfer Protocol, RFC 959, Oct. 1985, pp. 1–69.

Recommendations of the CCIR, 1990 vol. XI–Part 1 Broadcast Service (Television), pp. 1–124.

Reynolds, J.K., Post Office Protocol, RFC 918, Oct. 1984, pp. 1–5.

Rose, M., Post Office Protocol Version 3, RFC 1081, Nov. 1988, pp. 1–16.

Sofratev, "North American Broadcast Teletext Specification," Jun. 1981, Montrouge, France, pp. 1–240.

Schultz, J., "A History of the PROMIS Technology: An Effective Interface," *A History of Personal Workstations*, ACM Press, 1988, pp. 474–486.

Schultz, J., et al., "The Technology of PROMIS" Proceeding of the IEEE, vol. 67, No. 9, Sep. 1979, pp. 1237–1244.

Scientific–Atlanta Services, Features and Functions Annex 6, by Satellite Television Corporation, Nov. 1984, pp. 2–64.

Vixie, P., et al, "Name Server Operations Guide for BIND," Release 4.9.3, Chapter 10, pp. 2–29.

Long, M. E., et al., "An Enhanced RF Television Scrambling System Using Phase Modulation," 1987 NCTA Technical Papers, pp. 140–147.

McGinty, E., "Using Narrow Band Data Transmission as an Information Delivery System for CATV Application," 1986 NCTA Technical Papers, pp. 47–52.

Neville, T., et al., "The Application of National ANI to Pay–Per–View Ordering," 1988 NCTA Technical Papers, pp. 11–13.

O'Brien, T.E. Jr., "A Unified Approach to Data Transmission Over CATV Networks," 1981 NCTA Technical Papers, pp. 119–123.

Pidgeon, R.E., et al., "Frequency Allocation for Data and Video," 1983 NCTA Technical Papers, pp. 64–68.

"Programming the Vertical Blanking Interval," Broadcasting Sep. 24, 1990, p. 1.

Schatz, E., "Superguide Among Systems Touted For Interface," Multichannel News, Jul. 23, 1990, pp. 1–5.

Schoeneberger C.F., "Addressable Terminal Conrol Using the Vertical Interval," 1981 NCTA Technical Papers, pp. 34–40.

Shane, L.J., "Application of Data on Cable Systems," 1984 NCTA Technical Papers, pp. 148–155.

Stratton, F., "Broadband Packet–Switching," 1985 NCTA Technical Papers, pp. 304–307.

"Superguide, On–Screen Satellite Program Guide," 1990, pp. 1–7.

Thomas, W.L., "Full Field Tiered Addressable Teletext," 1982 NCTA Technical Papers, pp. 44–46.

TOCOM 55 Plus, TOCOM Inc., Pub. No. 060–3422–004, 1980, pp. 1–4.

Tydeman, J., et al., "Market Potential, Technology, Public Policy Issue," McGraw–Hill, Inc. 1982, pp. 1–314.

Wechselberger, A.J., "Encryption–Based Security Systems, What Makes Them Different and How Well are They Working?," 1987 NCTA Technical Papers, pp. 148–153.

Woodcock, D.A., et al., "Launching a Statewide ANI Passing Impulse PPV System," 1988 NCTA Technical Papers, pp. 4–10.

Garr, et al, "Data Broadcasting in the USA Low Cost Delivery Alternative and More," IEEE Transactions of Consumer Electronics, Oct. 17, 1990, pp. 877–884.

Gecsei, J., "The Architecture of Videotex Systems," 1983, Prentice Hall, Inglewood Cliffs, New Jersey, pp. 1–276.

Gifford, D., et al., "An Architecture for Large Scale Information Systems," 1985, pp. 161–170.

Gifford, D., et al., "The Application of Digital Broadcast Communication to Large Scale Information Systems," IEEE Journal On Selected Areas In Communications, vol. SAC–3, No. 3, May 1985, pp. 457–467.

"LSI Circuits for Teletext and Viewdata,"—The Lucy Generation, (no date given), pp. 1–80.

McKee, K.M., "Data Television—A Bright Star On The Color TV Horizon," Feb. 1, 1979, p. 55–63.

Mothersole, P., et al., "Broadcast Data Systems Teletext and RDS," Published by Butterworth & Co. (Publishers) Ltd, 1990, pp. 1–148.

Mothersole, P., "Broadcast & Teletext Systems," and "Teletex Decoders," TV & Video Engineer's Reference Book, Chs. 60–61, pp. 60/1–61/5, Edited by K.G. Jackson et al., (Butterworth–Heinemann 1991, Oxford).

Mothersole, P., "Teletext and Viewdata: New Information Systems Using The Domestic Television Recovery," Proc. IEEE, vol. 126, No. 12, Dec. 1979, pp. 1350–1354.

Pim, D.N., "Telesoftware Via Full Channel Teletext," (no date given), pp. 49–54.

Ref. 10–"World System Teletext and Data Broadcasting System," Technical Specification, Jan. 1989, pp. DTV–PA 000519–759.

Robinson, G. et al., "Touch–Tone Teletext—A Combined Teletext–ViewData System," IEEE Transactions on Consumer Electronics, vol. CE–25, No. 3, Decoy Network Technology With Automatic Signature Generation for Intrusion Detection and Intrusion Prevention Systems, No. 3, Jul. 1979, pp. 298–303.

Tanton, N.E., "UK Teletext–Evolution and Potential," BBC Research Department, IEEE Transactions on Consumer Electronics, vol. CE–25, No. 3, Jul. 1979, pp. 246–250.

Veith, R., "Television's Teletext," Elsevier Science Publishing Co., Inc., 1983, pp. 1–180.

Bown, H.G et al., "Telidon Technology Developments," Videotex '81 International Conference & Exhibition May 20–22, 1981—Toronto, Canada, pp. i–xxxiv & 1–470.

Campbell, G., et al., "Dig–Music on Demand Digital Musical Selection System Utilizing CATV Facilities," IEEE Transactions on Consumer Electronics, Sep. 1982, 8 total pgs.

Chambers, J.P., "Enhanced UK Teletext Moves Towards Still Pictures," 1980 IEEE Chicago Spring Conference, Part 1, pp. 527–554.

Press Release titled "Going is Good for Coral on Datacast," Apr. 23, 1987, 1 page.

Crowther, G.O., TeleText and ViewData Systems and Their Possible Extension to Europe and USA, 1979 IEEE Chicago Spring Conference, pp. 288–294.

McKenzie, G. A.., "Oracle—An Information Broadcasting Service Using Data Transmission in the Vertical Interval," Jan. 1974 Journal of the SMPTE, pp. 6–10.

Lemoine, D., "11th International Television Symposium" May 27–Jun. 1, 1979, p. 1–8.

Le Gall, D., "MPEG: A Video Compression Standard for Multimedia Applications"Publications of ACM Apr. 1991, pp. 47–58.

Roizen, J., "Teletext in the USA," SMPTE Journal, Jul. 1981, pp. 602–610.

James, A., "Oracle–Broadcasting the Written Word," Wireless World, Jul. 1973, pp. 1–3.

Sigel, E., "The Future of Videotext—Worldwide Prospects for Home/Office Electronic Information Service" 1983, pp. 1–197.

CBS/CCETT "North American Broadcast Teletext Specification," Jun. 22, 1981, pp. 24–240.

Herman, G., "The Datacycle Architecture for Very High Throughput Database Systems," ACM 0–89791–236–5/87/0005/0097, 1987 pp. 97, 99, 101 & 103.

Townsend, K., "Broadcast Data" British Library—"The World's Knowledge," Sep. 1988, pp. 36, 38 & 40.

"Transnational Data Report," re Cable and Wireless Global Digital Highway, Feb. 24, 1987, p. 2 total.

Woods, R., "Article in the Sunday Times, titled—Follow Shares on TV," Nov. 1, 1987, p. 1.

News article Sep. 1988 supplied by the British Library—The World's knowledge titled—"Halifax to use BBC,"'s Datacast service, Sep. 1988, pp. 2 total.

Charlish, G., "Coral Bets on BBC's Wavelength," Financial Times, May 7, 1987, pp. 1 total.

Levi, M., et al., "The Prevention of Cheque and Credit Card Fraud," Jun. 1991, pp. ii–vi and 1–51.

Chorafas, D., "Interactive Videotex—The Domesticated Computer," Jan. 1981, pp. 1–263.

Molina, H., et al. "An Implementation Of Reliable Broadcast Using An Unreliable Multicast Facility," 1988 IEEE, pp. 101–112.

Yamakawa, K., et al., "The study for an Advanced Use of Satellite Communication; The development of the Distributed Videotex DataBase Retrieval System Using Satellite Communication," Fujitsu Limited, Jan. 18–21, 1987, pp. 346–355.

Tseung, K.C.N., et al., "Guaranteed, Reliable, Secure Broadcast Networks," Phoenix Conference on Computers and Communications, IEEE Computer Society Press, Conference Proceedings Mar. 21–23, 1990, pp. 576–581.

Bradley, G., "Project Glass Testing Networked Video Tape Rentals," Digital Technology Spanning the Universe, IEEE Communications Society, Philadelphia, PA, Jun. 12–15, 1988, pp. 881–882.

Hurley, P., et al., "The Videotex and Teletext Handbook—Home and Office Communications Using Microcomputers and Terminals," 1995, pp. 1–404.

Hyams, P., "Datacast Gains Major Users," Article in Information World Review Newspaper, Nov. 1986, pp. 4 total.

Press Release titled—BBC "Datacast Continues Success In The Retail Sector,": Displayboard Information Service Announced by Nu–Media Group ltd., (no date given), pp. 1.

Brown, L., et al., "Nationwide Data Distribution Broadcasting Technology," (no date given), pp. 1.

Armytage, J.G., "Stock Market Pilot Pluts Puts Prices On Air," Computer Weekly, Nov. 6, 1986, pp. 1.

Cane, A., "Big Bang more of a continuous rumble" Feb. 24, 1987 in the Financial Times, pp. 1.

"Share Price Broadcasts To Beat Phone Strike," New Scientist, Feb. 5, 1987, pp. 1.

Electronic Publishing BBC spread Datacast in the Insurance Systems Bulletin, Jan. 1987, pp. 1.

Castell, S., "Nationwide Value Added and Data Services Using Data Broadcasting," (no date given), pp. 63, 65, 67 & 69.

Castell, S., Update of a Cd–Rom Using BBC Datacast to Provide a Nationwide Real–Time Information Service: The ECCTIS Educational Pilot, BBC Datacast, UK, Oct. 1987, pp. 101–110.

Nakagawa, S., et al. "Article titled—PCM Video Recording Using a Rotating Magnetic Sheet" 11th International Television Symposium Montreux (Switzerland) May 27–Jun. 1, 1979 Symposium Record, pp. 1–8.

Nasse, D., "625–Line Component Recording, BIT Rate Reduction and Error Protection," 11th International Television Symposium Montreux (Switzerland) May 27–Jun. 1, 1979 Symposium Record, pp. 1–10.

Breeze, E., "Television Line 21 Encoded Information and its Impact on Receiver Design," Received Aug. 28, 1972, pp. 234–237.

Baer, R., "Tele–Brief Novel User–Selectable Real Time News Headline Service for Cable TV," Sanders Associates, Inc., IEEE, vol. CE–25, No. 3, Jul. 1979, pp. 406–408.

Crowther, C.O., Dynamically Redefinable Character Sets' Mullard Limited in 1990 IEEE Transactions on Computer Electronics, vol. CE–26, Nov. 1980 Chicago Spring Conference, pp. 707–717.

Fischer, T., "What is the impact of Digital TV?" ITT Semiconductors—IEEE 1982, pp. 423–430.

Lucas, "625–Line PCM Composite PAL Signal Recording and Error Concealment," 11th International Television Symposium Montreux (Switzerland) May 27–Jun. 1, 1979 Symposium Record, 14 total pgs.

Arlen, G. H. "Thanks to the Memories: Teledelivery, Downloading and their roles in Cable TV," Cable '84, Arlen Communications Inc. pp. 52–55.

Rayman E. et al. "The Brighter Side of Television Delivery of Information in the VBI," Cable '84, pp. 159–163.

Dickinson, R.V.C., "Cable or Home Power for Off–Premises Addressables," E–Com Laboratories Division AM Cable TV Industries pp. 164–167.

Crowther, C.O., "Adaptation of U.K. Teletext System for 525/60 Operation," Mullard Limited—IEEE 1980, pp. 587–596.

Ciciora, W., et al, An Introduction to Teletext and Viewdata With Comments On Compatibility Zenith Radio Corporation—IEEE Transactions on Consumer Electronics Jul. 1979, pp. 235–245.

Gicca, F.A., "Digital Spacecraft TV Can Beat Bit–Rate And Weight Problems," Dec. 1962, Raytheon Co., pp. 73–78.

Digital Video—Selections from the SMPTE Journal and Other Publications published in Mar. 1977, Society of Motion Picture and Television Engineers, pp. 1–116.

Cominetti, et al., "Teletext Transmission Problems and Field–Trials Results" 11th International Television Symposium Montreux (Switzerland) May 27–Jun. 1, 1979 Symposium Record, pp. 1–12.

Steele, F.H., "An Experimental Digital Video Recorder Based on a One–Inch Type "C" Format Machine—A progress Report," Sony Broadcast Limited in 11th International Television Symposium Montreux (Switzerland) May 27–Jun. 1, 1979 Symposium Record, 8 total pgs.

Gibson, J., "Sample Rate Standardization for Digital Audio Recording," RCA Laboratories in 11th International Television Symposium Montreux (Switzerland) May 27–Jun. 1, 1979 Symposium Record, pp. 1–2.

Marti, B., The Concept of a Universal "Teletext" (Broadcast and Interactive videotex) decoder, microprocessor based, CCETT Rennes, France in 11th International Television Symposium Montreux (Switzerland) May 27–Jun. 1, 1979 Symposium Record, pp. 30 total.

Liou, M., "Overview of the px64 kbit/s Video Coding Standard," Communications of the AGM, Apr. 1991/vol. 34, No. 4, pp. 60–63.

Motoki, T., et al., "Present Status of Three–Dimensional Television Research," Proceedings of the IEEE, vol. 83, No. 7, Jul. 1995, pp. 1009–1054.

Goodall, W.M., "Television by Pulse Code Modulation" in The Bell System Technical Journal—Jan. 1951, pp. 33–49.

Bradley, S., "Data Compression for Image Storage and Transmission" presented at the Idea Symposium—May 1970, vol. 11/4 Fourth Quarter, pp. 147–150.

International Organization for Standardization—"MPEG Video Committe Draft," Dec. 18, 1990, pp. 1–56.

Pennebaker, W.B., et al., "JPEG Still Image Data Compression Standard," 1993, Van Nostrand Reinhold, Appex A, B, pp. 335–626.

"Line Transmission of Non–Telephone Signals," Video Codec for Audiovisual Services at px64kbit/s—ITU–T Recommendation H.261, Mar. 1993, pp. 1–25.

Baumunk, J.F., et al., "Pictorial Data transmission from a Space Vehicle" Electrical Engineering, Feb. 1960, pp. 134–138.

Carbrey, R.L., "Video Transmission Over Telephone Cable Pairs by Pulse Code Modulation" Published in the Sep. 1960 monthly by the Institute of Radio Engineers, Inc., pp. 1546–1561.

"Alphabets for CEEFAX,," Notebook, BBC Engineering including Engineering Division Monopraphs, No. 108, Dec. 1977, pp. 1–2.

Chambers, J.P., "Teletext—The Potential of an Extended System," International Broadcasting Convention, Metropole Conference and Exhibition Centre, Sep. 20–30, 1980, pp. 114–117.

Chambers, J.P., "Teletext alphabets and error protection," No. 173, Feb. 1979, pp. 25–29.

Chambers, J.P., "The Use of Coding Techniques to Reduce the Tape Consumption of Digital Television Recording" Proceedings of the Conference on Video and Data Recording, Jul. 10–12, 1973, pp. 71–74.

Shanmugam, K.S., "Digital and Analog Communication Systems" Time–Division Multiplexing, 1979, pp. 551–565.

Stafford, R. H., "Digital Television—Bandwidth Reduction and Communication Aspect," Aug. 1980, A Wiley–Interscience Publication, pp. 1–387.

Wallace, G.K., "The JPEG Still Picture Compression Standard," Communications of the ACM, vol. 34, No. 4, Apr. 1991, pp. 31–44.

Whelan, J., et al., "Digital TV Bandwidth Reduction Techniques as applied to Spacecraft Television," Volume of Technical Papers presented at AIAA Publication CP–12, Unmanned Spacecraft Meeting, Mar. 1–4, 1965, pp. 5–22.

Knight, J.M., et al., "Digital Television: Shrinking Bulky Bandwidths, Electronics," Dec. 14, 1964, pp. 77–84.

"Digital television" Article from the internet printed on Aug. 22, 2005, pp. 1–2.

"The History of Digital Television," Article from the internet, printed on Aug. 22, 2005, pp. 1–12.

Ohnsorge, H., "A Data Compression System for the Transmission of Digitalized Video Signals" IEEE Communications Society and the Seattle Section of IEEE, CAT. No. 73 CHO 744–3–CSCB, Jun. 11–13, 1973, pp. 48–5–48–11.

Riley, J. L., "Enhanced UK Teletext: Experimental Equipment for High–Quality Picture coding and other Enhancements," BBC RD, Jul. 1983, 1–14.

"Addressable Converters: A New Development at CableData," Via Cable, vol. 1, No. 12, Dec. 1981, pp. 1–11.

"The CableComputer," CableData, Preliminary Documentation, Nov. 1984, pp. 1–12.

"Cable Data Cable Computer Head End Preliminary Service Manual," Oct. 1995, pp. 1–52.

"HTU Delivery System," 2 total pgs.

"Program Listings Never Looked So Good," Inside Cablevision, Feb. 9, 1981, 3 pages.

"Engineering Report Prepared for Hughes Electronics Corporation and EchoStar Communications Corporation Regarding Cable Data HTU," Cochran Consulting, Inc., Aug. 27, 2001, pp. 1–99.

"Reguest for Information on Sky Cable," Hughes Communications, Jun. 15, 1990, pp. 1–41.

Non–Confidential Brief of Defendants–Appellants, Case No. 1:05–CV–00264, Judge Ron Clark, Mar. 28, 2007, 144 total pages, (pp. 42–54 relevant to case).

Mothersole, Peter, "Broadcast & Teletext Systems," and "Teletext Decoders", TV & Video Engineer's Reference Book, Chs. 60–61, pp. 60/1–61/5, Edited by K.G. Jackson et al., (Butterworth–Heinemann 1991, Oxford).

John Hendren / Staff, "New VCR Will Put Couch Potatoes In Heaven," Times Tribune, Business, Sep. 21, 1990, pp. 1–2.

"Programming the Vertical Blanking Interval", Broadcasting Sep. 24, 1990, pp. 1.

Schatz, Eric, "Superguide Among Systems Touted For Interface," Multichannel News, Jul. 23, 1990, pp. 1–5.

Time Teletext: Turn Your Home TV Screen into a Personal Information Center, Time Inc., (Date not available), pp. 1–9.

Tydeman, H. et al., Teletext and Videotext in the United States, pp. 1–314, (McGraw–Hill 1982).

Jan Gecsei, "Report in Comcast Cable Communications, LLC v. Finisar Corp. patent litigation", pp. 1–12, Proof of Service pp. 1, Invalidity Chart, pp. 1–8.

"Expert Report of Dr. Walter S. Ciciora in Reply to Reports of Dr. Randy Katz and Mr. John Hedger", pp. 1–10, Proof of Service pp. 1.

"Expert Report of Dr. Walter S. Ciciora re Invalidity of U.S. Patent No. 5,404,505", pp. 1–34, Index of Exhibits pp. 1, Proof of Service pp. 1, Exhibits 1–30, total pp. 184.

"Unofficial Oral Argument Transcript," Finisar Corp. v. The DIRECTV Group Inc. et al, 2007–1023–1024 United States Court of Appeals for the Federal Circuit, Jan. 7, 2008, pp. 1–18.

"Comcast Cable Communications, LLC's Invalidity Contentions"Case No. C–06–4206 WHA, Jan. 8, 2007, 1–8, Proof of Service 1 page, Exhibit A, Invalidity Chart for U.S. Patent 5,404,505, pp. 1–2; Exhibit B, Invalidity Chart for U.S. Patent 5,404,505 Pedro Barros & John Lopinto, pp. 1–2; Exhibit C, Invalidity Chart for U.S. Patent 5,404,505, A.J. Biggs & B.S. Barnby, pp. 1–2; Exhibit D, J.R. Chew, pp. 1–2; Exhibit E, Invalidity Chart for U.S. Patent 5,404, 505, D.N. Pim, pp. 1–2; Exhibit F, Invalidity Chart for U.S. Patent 5,404,505, Michael J. Garr & Mark S. Richer, pp. 1–2; Exhibit G, Invalidity Chart for U.S. Patent 5,404,505, David K. Gifford et al., pp. 1–3; Exhibit H, Invalidity Chart for U.S. Patent 5,404,505, Wesley A. Clark and Charles E. Molnar, pp. 1–2; Exhibit I, Invalidity Chart for U.S. Patent 5,404,505, M.L. Ellis et al., pp. 1–2; Exhibit J, Invalidity Chart for U.S. Patent 5,404,505, Ken McKee, pp. 1–2; Exhibit K, Invalidity Chart for U.S. Patent 5, 404,505, Peter Mothersole & Norman W. White, pp. 1–4; Exhibit L, Invalidity Chart for U.S. Patent 5,404,505, Sprague et al., pp. 1–2; Exhibit M, Gary Robinson & William Loveless, pp. 1–2; Exhibit N, Invalidity Chart for U.S. Patent 5,404,505, Billy L. William, Jr., pp. 1–2; Exhibit O, Invalidity Chart for U.S. Patent 5,404,505, The CableData Product offered for sale in the US; and . . . , pp. 1–3; Exhibit P, Invalidity Chart for U.S. Patent 5,404,505, Richard H. Veith, pp. 1–2; Exhibit Q, Invalidity Chart for U.S. Patent 5,404,505, Method of Encoding Market Data and . . . , pp. 1–2; Exhibit R, Invalidity Chart for U.S. Patent 5,404,505, Receiver Access Interface to Service . . . , pp. 1–2; Exhibit S, Invalidity Chart for U.S. Patent 5,404,505, Method and Apparatus for Communication of Video . . . , pp. 1–2; Exhibit T, Invalidity Chart for U.S. Patent 5,404,505, Broadcast Teletext Specification 1976 . . . , pp. 1–2; Exhibit U, Invalidity Chart for U.S. Patent 5,404,505, The BBC Datacast System, as described . . . , pp. 1–3, Exhibit V, Invalidity Chart for U.S. Patent 5,404,505, World System Teletext and Data Broadcasting System . . . , pp. 1–2; Exhibit W, Invalidity Chart for U.S. Patent 5,404,505, Jan Gecsei, pp. 1–5; Exhibit X, Invalidity, Invalidity Chart for U.S. Patent 5,404,505, Proceedings of Videotext '81 . . . , pp. 1–2;, Exhibit Y, Invalidity Chart for U.S. Patent 5,404,505, Method and Apparatus for Digital Serical Scanning . . . , pp. 1–2; Exhibit Z, Invalidity Chart for U.S. Patent 5,404,505 References, pp. 1–7.

Clifford et al., "The Application of Digital Broadcast Communication to Large Scale Information Systems", IEEE Journal On Selected Areas In Communications, vol. SAC–3, No. 3, May 1985, pp. 457–467.

DirectTV Expert Report for Dr. Gary Tjaden re Invalidity of U.S. Patent No. 5,404,505, Mar. 8, 2006 pp. 1–27; Exhibit 1, Biographical Sketch, pp. 1–5; Exhibit 2, Memorandum Opinion and Order Construing Claim Terms of US Patent No. 5,404,505, pp. 1–21, 2nd Order pp. 1–3; Exhibit 3, References Considered, pp. 1–2; Exhibit 4, Analysis of Broadcast Data *Teachings Against the '505 Patent, pp. 1–13; Exhibit 5, Analysis of Teletext Spec. *Teachings Against the '505 Patent, pp. 1–12; Exhibit 6, Analysis of Robinson, *Teachings Against the '505 Patent, pp. 1–12; Exhibit 7, Analysis of Viewdata 80*, *Teaching Against the '505 Patent, pp. 1–19; Exhibit 8, Analysis of Index *Teachings Against the '505 Patent, pp. 1–13; Exhibit 9, Analysis of Architecture Videotext* *Teachings Against the '505 Patent, pp. 1–13; Exhibit 10, Analysis of Pin *Teachings Against the '505 Patent, pp. 1–14; Exhibit 11, Analysis of Annex 6 *Teachings Against the '505 Patent, pp. 1–14; Exhibit 12, Analysis of Cavendish *Teachings Against the '505 Patent, pp. 1–20, Exhibit 13; Analysis of Superguide *Teachings Against the '505 Patent, pp. 1–17; Exhibit 14, Analysis of CableData *Teachings Against the '505 Patent, pp. 1–17.

DirectTV's Patent Rule 3–3 Preliminary Invalidity Contentions, Civil Action No. 1:05–CV–0264, Aug. 15, 2005, pp. 1–1; Certificate of Service, 1 pg.; Exhibit A, Invalidity Chart pp. 1–40.

DirectTV's Revised Patent Rule 3–3 Preliminary Invalidity Contentions, Civil Action No. 1:05–CV–0264, Nov. 21, 2005, pp. 1–12; Certificate of Service, 1 pg.; Exhibit A, Revised Invalidity Chart 1–170; Exhibit B, Revised List of Invalidity References, pp. 1–9.

DirectTV's Motion for Summary Judgment of Invalidity of Claims 1, 2, 7, 9–11 and 37 of the 5,404,505 Patent, Civil Action No. 1:05–CV–0264, Mar. 8, 2006, pp. 1–5; Certificate of Service, 1 pg.; Exhibits A, Memorandum Opinion and Order Construing Claim Terms of US Patent 5,404,505, pp. 1–5, Exhibit B, Answer and Counterclaims of Defendants to Plaintiff's Complaint for Patent Infringement, pp. 1–4, Exhibit C, Complaint for Patent Infringement, pp. 1–5.

DirectTV's Patent Rule 3–6 Final Invalidity Contentions, Civil Action No. 1:05–CV–0264, Mar. 14, 2006, pp. 1–20; Certificate of Service, 1 page; Exhibit A, Final Invalidity Contentions U.S. Patent 5,404,505 Patent Rules 3–3(a) & 3–3(b) Chart, pp. 1–6.

Expert Report of Dr. Charles Neuhauser re Invalidity of US 5,404,505 Patent, Civil Action No. 1:05–CV–0264, Mar. 8, 2006, pp. 1–11; Certificate of Service 1 pg; , Exhibit A, Dr. Charles Neuhauser Professional Experience, pp. 1–4; Billing Rate Information, pp. 1–2; Exhibit B, Memorandum Opinion and Order Construing Claim Terms of US. 5,404, 505, pp. 1–21; Exhibit C, Second Order Claim Terms of US. 5,404,505, pp. 1–3; Exhibit D, Claim Chart for Clark/Mohar System, pp. 1–18; Exhibit E, Claim Chart for Sky Cable System, pp. 1–7; Exhibit F, Claim Chart for European Patent Specification EP 0 472 521 B1, pp. 1–15; Exhibit G, Claim Chart for Promis System, pp. 1–15; Exhibit H, Claim Chart for Patent 5,241,305, pp. 1–7; Exhibit I, Claim Chart for U.S. Patent 4,868,866, pp. 12; Exhibit J, Claim Chart for Internet, with the Domain–Name System (DNS), pp. 1–8; Exhibit K, Claim Chart for NetNews, pp. 1–7; Exhibit L, Claim Chart for E–Mail Fetching, pp. 1–5; Exhibit M, Claim Chart for LISTSERV, pp. 1–5; Exhibit N., Claim Chart for U.S. Patent 5,215,369, pp. 1–8, Exhibit O, Claim Chart for U.S. Patent 4,751,578, pp. 1–8; Exhibit P, Claim Chart for U.S. Patent 5,038,211, pp. 1–8; Exhibit Q, Claim Chart for U.S. Patent 5,293,357, pp. 1–8; Exhibit R, Claim Chart for 11th International Television Symposium, pp. 1–8; Exhibit S, Claim Chart for Digital Transmission of Broadcast Television Reduced Bit Rate, pp. 1–8; Exhibit T, Claim Chart for Dynamically Redefinable Character Sets—D.R.C.S., pp. 1–8; Exhibit U, Claim Chart for MPED: A Video Compression Standard for Multimedia Applications, pp. 8; Exhibit V, Claim Chart for Oracle—An Information Broadcasting Service Using Data Transmission in the Vertical Interval, pp. 8; Exhibit W, Claim Chart for Polychannel Systems for Mass Communication, pp. 1–7; Exhibit X, Claim Chart for Teletext in the USA, pp. 1–7; Exhibit Y, Claim Chart for CD–ROM Database Using BBC Database, pp. 1–8; Exhibit Z, Claim Chart for CCIR 601 System, pp. 1–7.

Finisar Opposition to Defendant's Motion for Summary Judgement of Invalidity of Claims 1, 2, 7, 9–11 and 37 of the 5,404,505 Patent, Civil Action No. 1:05–CV–0264, Mar. 23, 2006, pp. 1–36, Exhibit A, Declaration of Brent E. Nelson, Ph.D., in Support of Finisar's Reply Brief of Claim Construction, pp. 1–5; Exhibit B, U.S. Patent 5,404,505, pp. 1–1–25; Exhibit C, Brent E. Nelson, Ph.D., in Support of Finisar's Motion for Reconsideration of Indefiniteness, pp. 1–5; Exhibit 1, Claims , pp. 1–16; Exhibit 2, Examiner's Action, pp. 1–10; Exhibit 3, U.S. Patent 4,706,121, pp. 1–35; Exhibit 4, U.S. Patent 4,429,385, pp. 1–21; Exhibit 5; Examiners Action, pp. 1–6; Exhibit D, Declaration of Brent E. Nelson, Ph.D. in Opposition to DirectTV's Motion for Summary Judgment of Indefiniteness, pp. 1–2; Exhibit E, Claims, pp. 1–16; Exhibit F, Examiner's Action, pp. 10; Exhibit G, Reporters Transcript of Claim Construction Hearing Afternoon Session, pp. 1–2.

DirectTV's Motion and Memorandum in Support of its of Invalidity Motion for Summary Judgment of Invalidity of Claims 16, 17, 22,24, 25, 26, 39, of and 44 U.S. Patent 5,404,505 based on the Gecsei Textbook, Apr. 3, 2006, pp. 1–31; Exhibit A, The Architecture of Videotex Systems, pp. 2–37; 2nd Exhibit A, The Architecture of Videotex Systems, 2–276; Exhibit B, Declaration of Dr. Gary S. Tjaden in Support of a Motion for Summary Judgment Due to Invalidity of U.S. Patent No. 5,404,505, in view of Gecsei Piror Art Textbook, pp. 1–4; Exhibit 1, Biographical Sketch, pp. 1–5; Exhibit 2, Analysis of Architecture of Videotext *Teachings Against the '505 Patent, pp. 1–13; Exhibit B, Declaration of Dr. Gary S. Tjaden Enclosing a Background Tutorial that Explains Data Broadcasting Technology, pp. 1–18; Exhibit 1, Biographical Sketch, pp. 1–5; Exhibit 2, Memorandum Opinion and Order Construing Claim Terms of United States Patent No. 5,404,505, pp. 1–21, Second Order on Claim Terms of United States 5,404,505, pp. 1–3, Order Granting Motion for Clarification of the Constructions of the Phrase "downloading into a memory storage device", pp. 1–4; Exhibit 3, Reference list, 1 pg.

DirectTV's Motion and Memorandum in Support of its of Invalidity Motion for Summary Judgment of Invalidity of Claims 16, 17, 22, 24, 25, 26, 39 of and 44 U.S. Patent 5,404,505 (In view of Superguide Systems), Apr. 3, 2006, pp. 1–25; Exhibit 1, Declaration of Peter D. Hallenbeck in Support of Defendants'Motion for Summary Judgment of Invalidity of Claims 16–17, 22, 24–26, 39, and 44 of United States Patent 5,404,505 (in view Superguide systems), pp. 1–25; Exhibit 2, Plaintiff Finisar Corporation's Second Supplemental Disclosure of Asserted Claims and Preliminary Infringement Contentions, pp. 1–4.

Plaintiff Finisar's Brief in Opposition to DirecTV's Motion for Summary Judgment of Invalidity of Claims 16, 17, 22, 24, 25, 26, 39 of and 44 U.S. Patent 5,404,505 based on the Gecsei Textbook, Apr. 21, 2006, pp. 1–33, Exhibit A, Declaration of Doug Eaton C Enf MIEE BSc (Hons), pp. 1–14; Exhibit A, C.V. of Doug. Eaton BSc (Hons) Salford C.Eng. MIEE, pp. 1–2.

DirectTV's Reply in Support of its Motion for Summary Judgment of Invalidity of Claims 16, 17, 22, 24, 25, 26, 39 of and 44 U.S. Patent 5,404,505 based on the Gecsei Textbook, Apr. 28, 2006, pp. 1–12; Exhibit A 1 pg.

Scientific–Atlanta Services, Features and Functions Annex 6 by Satellite Television Corporation, Nov. 8, 1984, pp. 1–524.
Diermann, L., "11th International Televsion Symposium" May 27–Jun. 1, 1979, pp. 1–8.
International Telecommunication Union Recommendations of the CCIR, 1990 vol. XI–Part 1, 500 pages.
Sigel, "The Future of Videotext—Worldwide Prospects for Home/Offcie Electronic Information Service" 1983, pp. 1–197.
Chapter 10—Database for Videotex, (no date given), pp. 174–177.
Newspaper article titled—Coral bets on BBC's length, pp. 1 total (no date given).
Section 1 Technology , Mar. 14, 1991—The Finicial Times Limited, pp. 1–2.
Aircall Teletext—How Aircall Teletext works?, (no date given), pp. 5 total.
BBC Datacast—The Facts, (no date given) pp. 1–2.
"A New Generation Of Data Transmission Networks Using Broadcast Video Channels", BBC Datacast—Enterprises Ltd. 1986, pp. 1–10.
Brown et al., "Nationwide Data Distribution Broadcasting Technology" (no date given), pp. 1.
Final Judgment, Civil Action No. 1:05–CV–264, dated Jul. 7, 2006.
MPEP § 2286, rev. 3 pp. 2200–134–2200–136, Aug. 2005.
MPEP § 2111, rev. 3, pp. 2100–46–21000–47, Aug. 2005.
MPEP § 2258, rev. 3, pp. 2200–77–2200–84, Aug. 2005.
Ian Gecsei, "The Architecture of Videotex Systems", Prentice–Hall, Inc., 1983.
A.J. Biggs et al., "Broadcast Data in Television", GEC Journal of Science and Technology, vol. 41, No. 4, pp. 117–124, London 1974.
Gary Robinson et al., ""Touch–Tone"Teletext: A Combined Teletext—Viewdata System", IEEE Translations on consumer Electronics, vol. CE–25, No. 3, pp. 298–303, Jul. 1979.
Memorandum Opinion and Order constructing Claim Terms of United States Patent No. 5,404,505, Civil Action No. 1:05–CV–264, dated Feb. 17, 2006, pp. 1–21.
Order Granting Motion for Clarification of the Construction of the Phase "downloading into a memory storage device", Civil Action No. 1:05–CV–264, dated Mar. 28, 2006, pp. 1–4.
Memorandum Opinion and Order Construing claims 25 of United States Patent No. 5,404,505, Civil Action No. 1:05–CV–264, dated Apr. 19, 2006, pp. 1–7.
Defendants' Motion and Memorandum in Support of Its Motion for Summary Judgment of Invalidity of Claims 16, 17, 22, 24, 25, 26, 39, and 44 of U.S. Patent No. 5,404,505 Based on Gecsei Textbook; Civil Action No. 1:05–CV–264; pp. i–ii and 1–30, filed Apr. 3, 2006, with attached exhibits.
Reporter's Transcript of Pretrial Hearing held May 30, 2006; Civil Action No. 1:05–CV–264; pp. 1–119.
Transcript of Hearing Before the Honorable Judge Ron Clark, United States District Judge Jul. 26, 2006; pp. 1–59, Civil Action No. 1:05–CV–264.
Order Denying Defendants' Renewed Notion for Judgment as a Matter of Law and Motion for New Trial, and Denying Motion to Amend Judgment, Civil Action No. 1:05–CV–264, pp. 1–8, dated Sep. 1, 2006.
MPEP § 2131.02, rev. 3, pp. 2100–78–2100–79, Aug. 2005.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-12, 16, 17, 20-22, 24-26, 37, 39 and 44 are cancelled.

Claims 13-15, 18, 19, 23, 27-36, 38, 40-43 and 45-48 were not reexamined.

\* \* \* \* \*